United States Patent
Nishi et al.

(10) Patent No.: US 9,843,389 B2
(45) Date of Patent: Dec. 12, 2017

(54) OPTICAL MEDIUM REPRODUCTION DEVICE AND OPTICAL MEDIUM REPRODUCTION METHOD

(71) Applicant: Sony Corporation, Tokyo (JP)

(72) Inventors: Noriaki Nishi, Kanagawa (JP); Kimihiro Saito, Kanagawa (JP); Junya Shiraishi, Nagano (JP)

(73) Assignee: Sony Corporation, Tokyo (JP)

( * ) Notice: Subject to any disclaimer, the term of this patent is extended or adjusted under 35 U.S.C. 154(b) by 9 days.

(21) Appl. No.: 14/910,396

(22) PCT Filed: Jun. 26, 2014

(86) PCT No.: PCT/JP2014/003412
§ 371 (c)(1),
(2) Date: Feb. 5, 2016

(87) PCT Pub. No.: WO2015/022767
PCT Pub. Date: Feb. 19, 2015

(65) Prior Publication Data
US 2016/0218808 A1 Jul. 28, 2016

(30) Foreign Application Priority Data
Aug. 14, 2013 (JP) .................. 2013-168485

(51) Int. Cl.
*H04B 10/69* (2013.01)
*G11B 7/131* (2012.01)
(Continued)

(52) U.S. Cl.
CPC ......... *H04B 10/2507* (2013.01); *G11B 7/131* (2013.01); *G11B 20/10009* (2013.01);
(Continued)

(58) Field of Classification Search
CPC .............................. H04B 10/695; G11B 7/005
See application file for complete search history.

(56) References Cited

U.S. PATENT DOCUMENTS

| | | |
|---|---|---|
| 3,913,076 A | 10/1975 | Lehureau et al. |
| 4,633,457 A | 12/1986 | Yamamoto |

(Continued)

FOREIGN PATENT DOCUMENTS

| | | |
|---|---|---|
| DE | 41 19 384 A1 | 12/1991 |
| EP | 0 375 342 A2 | 6/1990 |

(Continued)

OTHER PUBLICATIONS

[No Author Listed], Trial Production of Magneto Optical Disk Device Whose Storage Density is Doubled by Decreasing Track Pitch. Nikkei Electronics. 1990; 495:98-9.

(Continued)

*Primary Examiner* — Shi K Li
(74) *Attorney, Agent, or Firm* — Wolf, Greenfield & Sacks, P.C.

(57) ABSTRACT

There is provided an optical medium reproduction device that optically reproduces an optical medium in which a plurality of tracks are provided, the optical medium reproduction device including: a detection unit configured to divide a cross-section of a beam returning from the optical medium into at least one channel corresponding to an outer region in a radial direction, at least one channel corresponding to a region that is different in position in a tangential direction, and a channel corresponding to the other region, and form detection signals of the channels; a multi-input equalizer unit including a plurality of equalizer units to which the detection signals of the plurality of channels are supplied, respectively, the multi-input equalizer unit being configured to calculate outputs of the plurality of equalizer units and output the outputs as an equalized signal in a (Continued)

manner that a phase difference between two of the regions is set to be a predetermined phase difference; and a binarization unit configured to perform a binarization process on the equalized signal to obtain binary data.

19 Claims, 38 Drawing Sheets

(51) Int. Cl.
| | |
|---|---|
| H04B 10/2507 | (2013.01) |
| G11B 20/10 | (2006.01) |
| H04B 10/079 | (2013.01) |
| H04L 25/03 | (2006.01) |

(52) U.S. Cl.
CPC ... G11B 20/10046 (2013.01); H04B 10/0795 (2013.01); H04L 25/03006 (2013.01)

(56) References Cited

U.S. PATENT DOCUMENTS

| | | | |
|---|---|---|---|
| 5,347,504 A | 9/1994 | Ito et al. | |
| 5,386,410 A | 1/1995 | Nagasaki et al. | |
| 5,400,189 A | 3/1995 | Sato et al. | |
| 5,416,766 A | 5/1995 | Horimai | |
| 5,420,847 A | 5/1995 | Maeda et al. | |
| 5,508,990 A | 4/1996 | Nagasaki et al. | |
| 5,581,531 A | 12/1996 | Ito et al. | |
| 5,617,389 A | 4/1997 | Satoh et al. | |
| 5,621,717 A | 4/1997 | Finkelstein et al. | |
| 5,625,613 A | 4/1997 | Kato et al. | |
| 5,719,835 A | 2/1998 | Ishika | |
| 5,754,503 A | 5/1998 | Senba et al. | |
| 5,841,754 A | 11/1998 | Lee et al. | |
| 5,907,530 A | 5/1999 | Cho et al. | |
| 6,091,692 A | 7/2000 | Morimoto | |
| 6,483,650 B1 | 11/2002 | Imai | |
| 6,577,568 B1* | 6/2003 | Konishi | G11B 7/0945 369/44.32 |
| 6,580,676 B1 | 6/2003 | Yanagisawa et al. | |
| 6,584,049 B1* | 6/2003 | Ma | G11B 7/005 369/44.41 |
| 6,992,965 B1 | 1/2006 | Glushko et al. | |
| 7,826,323 B2 | 11/2010 | Hayashi | |
| 8,111,477 B2 | 2/2012 | Nakagawa | |
| 8,369,201 B2 | 2/2013 | Saito et al. | |
| 8,379,503 B2 | 2/2013 | Yamatsu et al. | |
| 8,416,656 B2 | 4/2013 | Nishi | |
| 8,582,402 B2 | 11/2013 | Horigome | |
| 8,685,517 B2 | 4/2014 | Miki et al. | |
| 8,867,324 B2 | 10/2014 | Sekiguchi et al. | |
| 8,929,190 B2 | 1/2015 | Saito et al. | |
| 9,111,555 B2 | 8/2015 | Igari et al. | |
| 9,672,859 B2 | 6/2017 | Nishi et al. | |
| 9,672,861 B2 | 6/2017 | Takahashi et al. | |
| 2001/0038592 A1 | 11/2001 | Kobayashi | |
| 2002/0018420 A1 | 2/2002 | Nishi | |
| 2002/0027843 A1 | 3/2002 | Kim et al. | |
| 2002/0159378 A1 | 10/2002 | Lee et al. | |
| 2003/0016606 A1 | 1/2003 | Urita et al. | |
| 2003/0053393 A1 | 3/2003 | Shimano et al. | |
| 2005/0068864 A1 | 3/2005 | Ma et al. | |
| 2005/0199778 A1 | 9/2005 | Kadowaki et al. | |
| 2006/0104173 A1 | 5/2006 | Shibuya et al. | |
| 2006/0114791 A1 | 6/2006 | Marshall et al. | |
| 2006/0285461 A1 | 12/2006 | Ashizaki et al. | |
| 2007/0097834 A1 | 5/2007 | Sakai | |
| 2007/0286048 A1 | 12/2007 | Hayashi | |
| 2008/0056081 A1 | 3/2008 | Otsuka et al. | |
| 2008/0198730 A1 | 8/2008 | Mori et al. | |
| 2008/0239428 A1 | 10/2008 | Bell et al. | |
| 2009/0028021 A1 | 1/2009 | Yin et al. | |
| 2009/0238048 A1 | 9/2009 | Feng et al. | |
| 2009/0290473 A1 | 11/2009 | Katayama | |
| 2009/0303850 A1 | 12/2009 | Nakai et al. | |
| 2009/0316561 A1 | 12/2009 | Nishimura et al. | |
| 2010/0007984 A1 | 1/2010 | Nakagawa | |
| 2010/0157753 A1 | 6/2010 | Iwanaga | |
| 2011/0242951 A1 | 10/2011 | Saito et al. | |
| 2012/0008484 A1 | 1/2012 | Yamatsu et al. | |
| 2012/0082201 A1 | 4/2012 | Shiraishi | |
| 2012/0106308 A1 | 5/2012 | Horigome | |
| 2012/0163152 A1 | 6/2012 | Hosaka et al. | |
| 2012/0182851 A1 | 7/2012 | Saito et al. | |
| 2012/0294131 A1 | 11/2012 | Nishi | |
| 2013/0010583 A1 | 1/2013 | Miyamoto et al. | |
| 2013/0052389 A1 | 2/2013 | Miki et al. | |
| 2013/0235713 A1 | 9/2013 | Suzuki | |
| 2013/0322228 A1 | 12/2013 | Saito et al. | |
| 2014/0036651 A1 | 2/2014 | Sekiguchi et al. | |
| 2014/0044940 A1 | 2/2014 | Ikuta et al. | |
| 2014/0322476 A1 | 10/2014 | Igari et al. | |
| 2014/0341006 A1* | 11/2014 | Miyashita | G11B 20/10046 369/30.18 |
| 2016/0155468 A1 | 6/2016 | Nishi et al. | |
| 2016/0196848 A1 | 7/2016 | Nishi et al. | |
| 2016/0275983 A1 | 9/2016 | Takahashi et al. | |
| 2017/0117011 A1 | 4/2017 | Nishi et al. | |
| 2017/0133049 A1 | 5/2017 | Nishi et al. | |

FOREIGN PATENT DOCUMENTS

| | | |
|---|---|---|
| EP | 1 178 484 A2 | 2/2002 |
| EP | 2 437 262 A1 | 4/2012 |
| JP | 03-156729 A | 7/1991 |
| JP | 05-242512 A | 9/1993 |
| JP | 07-093757 A | 4/1995 |
| JP | 08-249664 A | 9/1996 |
| JP | 2000-048488 A | 2/2000 |
| JP | 2000-315322 A | 11/2000 |
| JP | 2001-034969 A | 2/2001 |
| JP | 2001-357545 A | 12/2001 |
| JP | 2003-223761 A | 8/2003 |
| JP | 2005-332453 A | 12/2005 |
| JP | 2006-338782 A | 12/2006 |
| JP | 2007-058887 A | 3/2007 |
| JP | 4023365 B2 | 12/2007 |
| JP | 2008-108325 A | 5/2008 |
| JP | 2010-225237 A | 10/2010 |
| JP | 2010-244672 A | 10/2010 |
| JP | 2012-079385 A2 | 4/2012 |
| WO | WO 2014/054246 A1 | 4/2014 |
| WO | WO 2014/057674 A1 | 4/2014 |

OTHER PUBLICATIONS

Toshiyasu Yoshizawa, [Trial Production of Magneto Optical Disk Device Whose Storage Density is Doubled by Decreasing Track Pitch] Track Pitch o Tsumete Kiroku Mitsodu o 2 Bai ni shita Hikari Jiki Disk Sochi o Shisaku, Nikkei Electronics, No. 495, Mar. 19, 1990 (Mar. 19, 1990).

Extended European Search Report dated Jul. 10, 2017 in connection with European Application No. 14836827.7.

* cited by examiner

FIG. 9
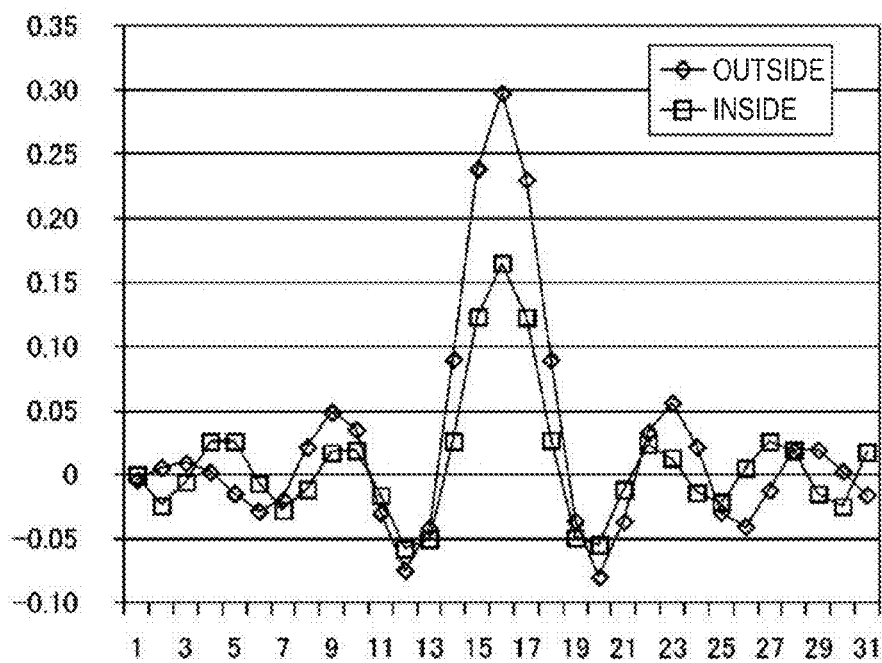
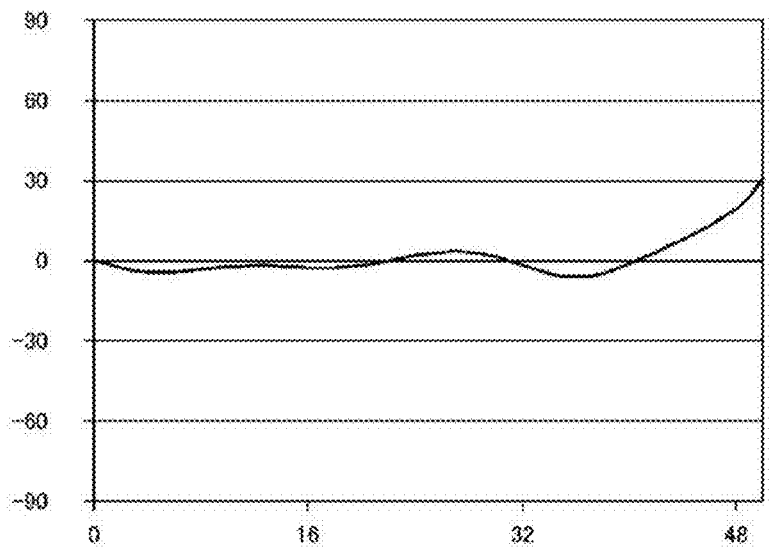

FIG. 16
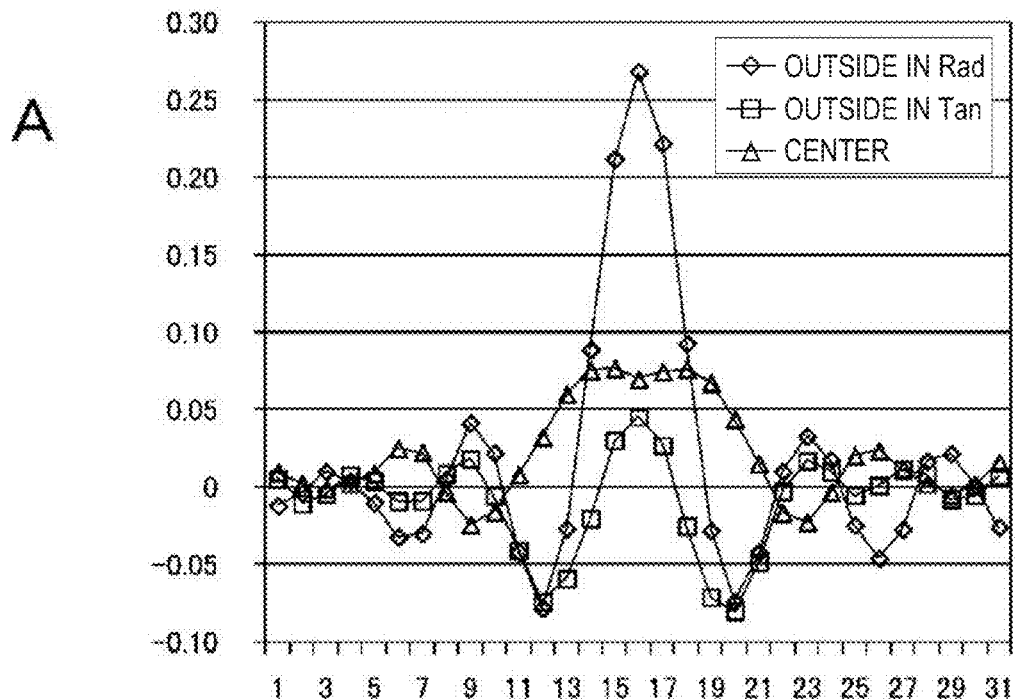
A
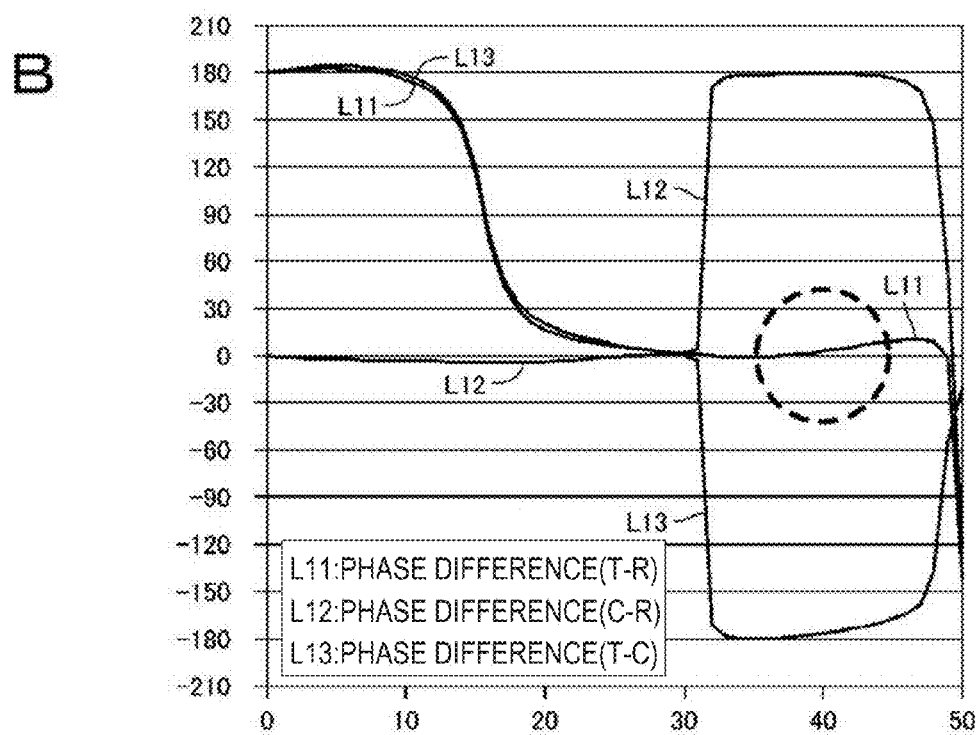
B

FIG. 21
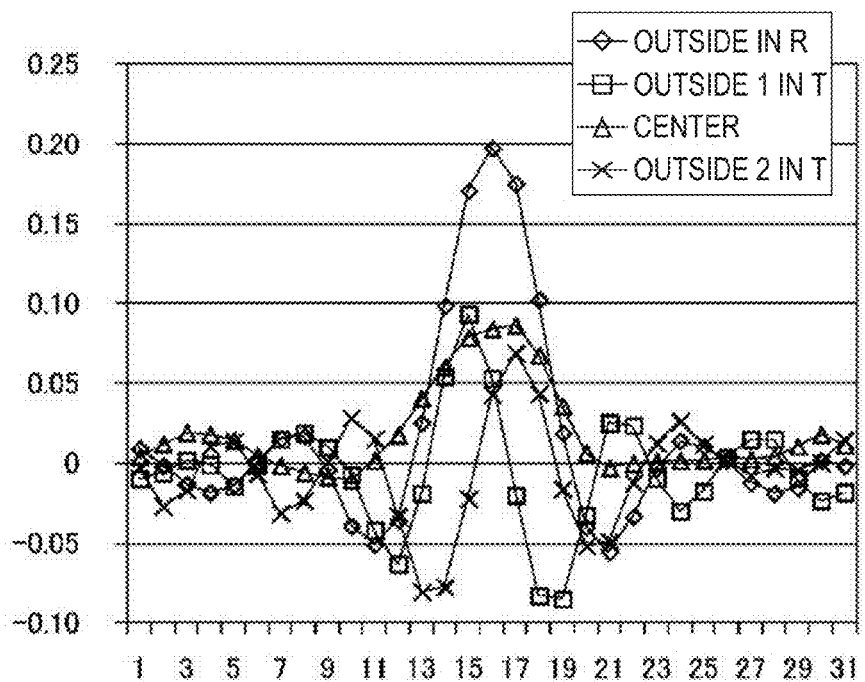
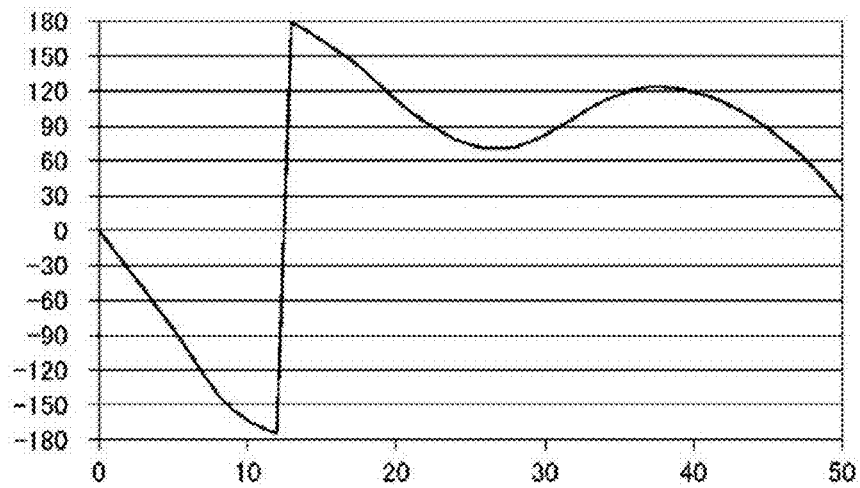

FIG. 24
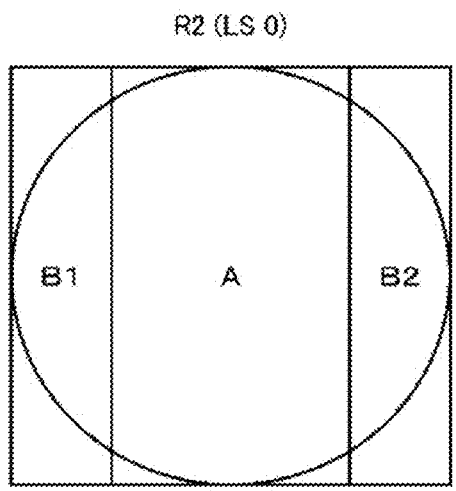
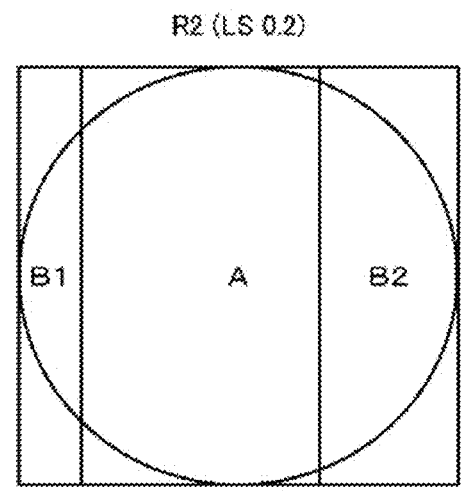
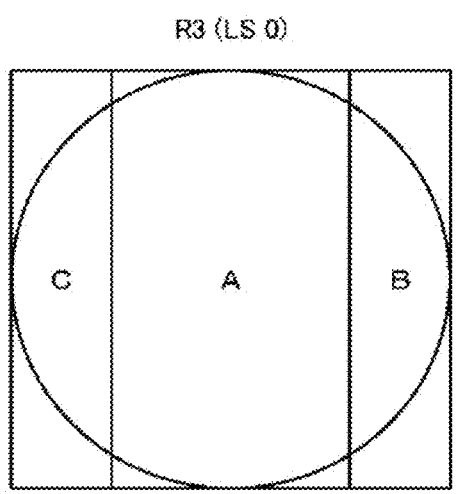
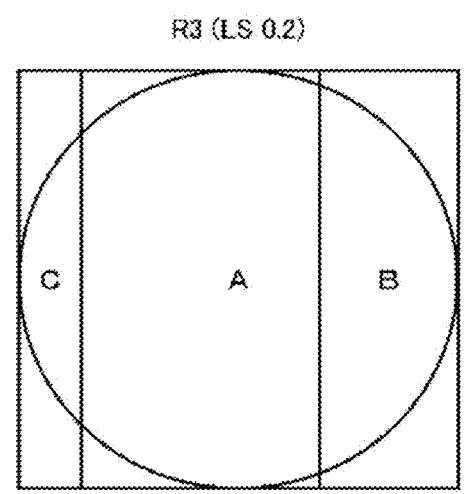

FIG. 26
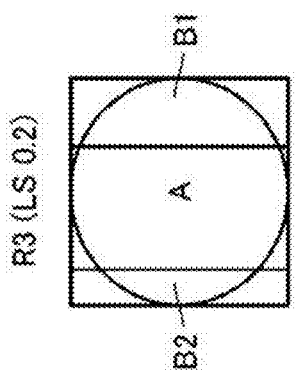
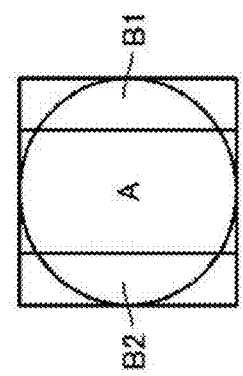
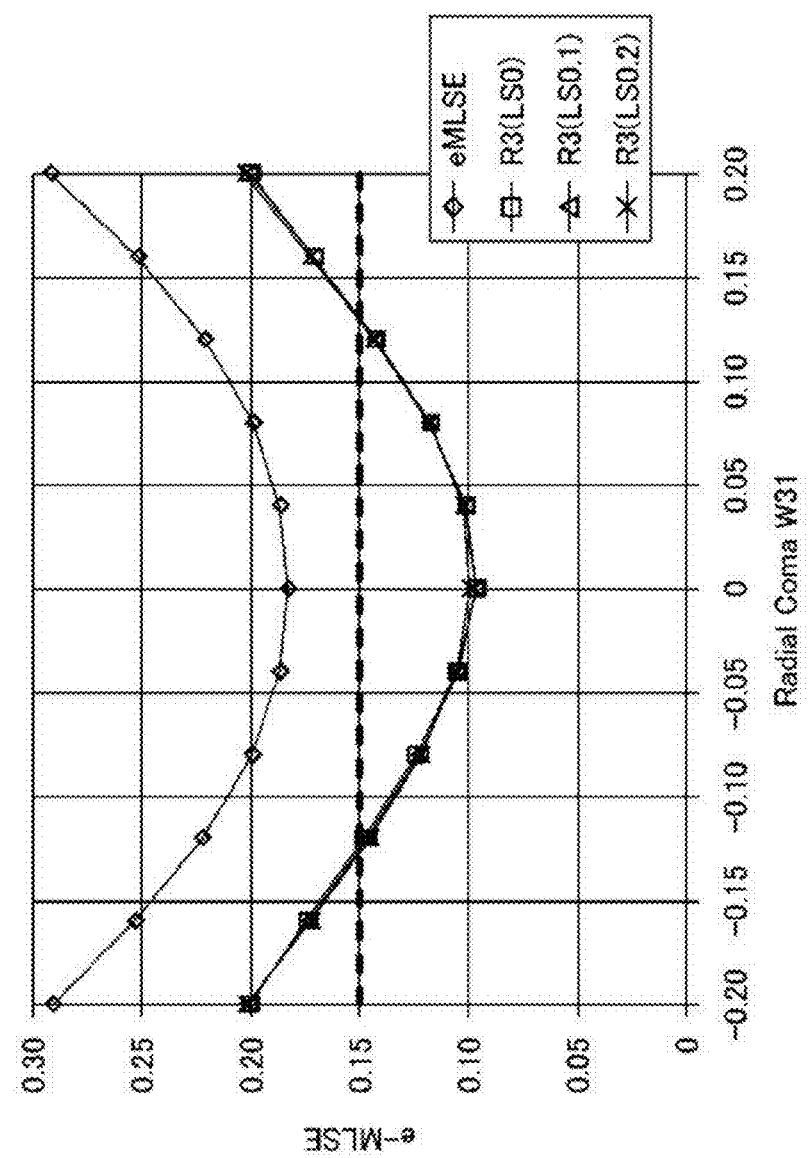

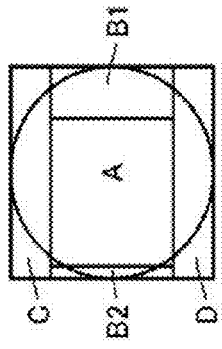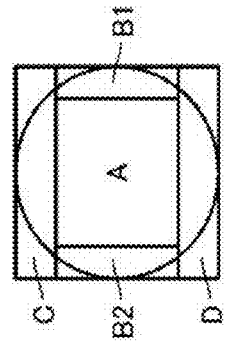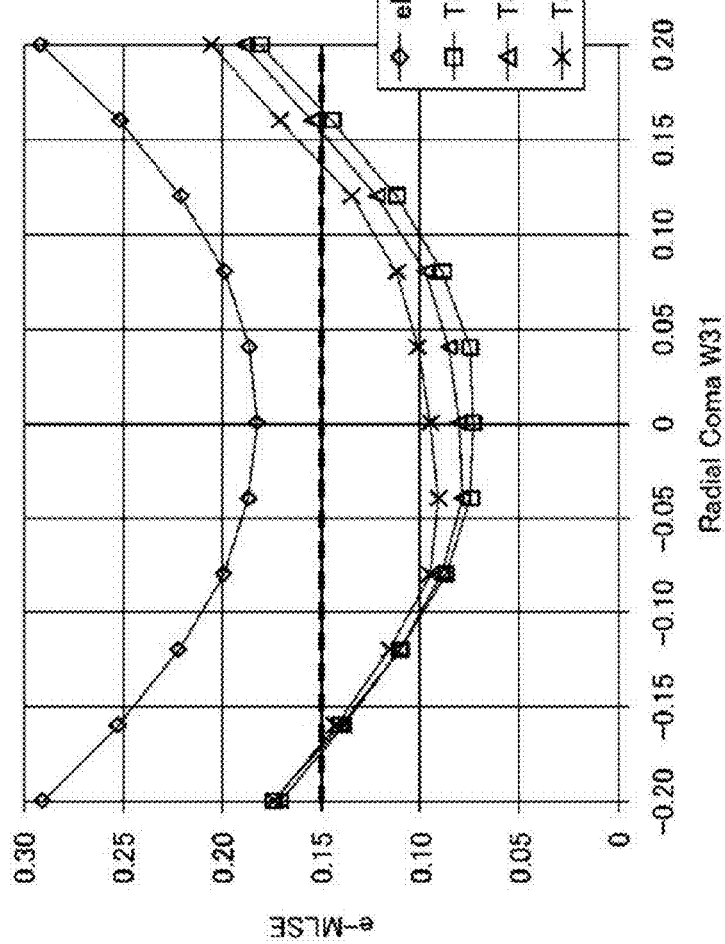
FIG. 27

FIG. 28
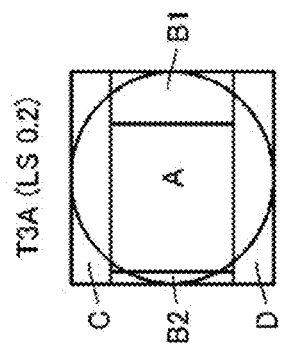
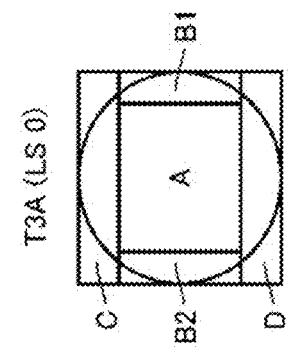
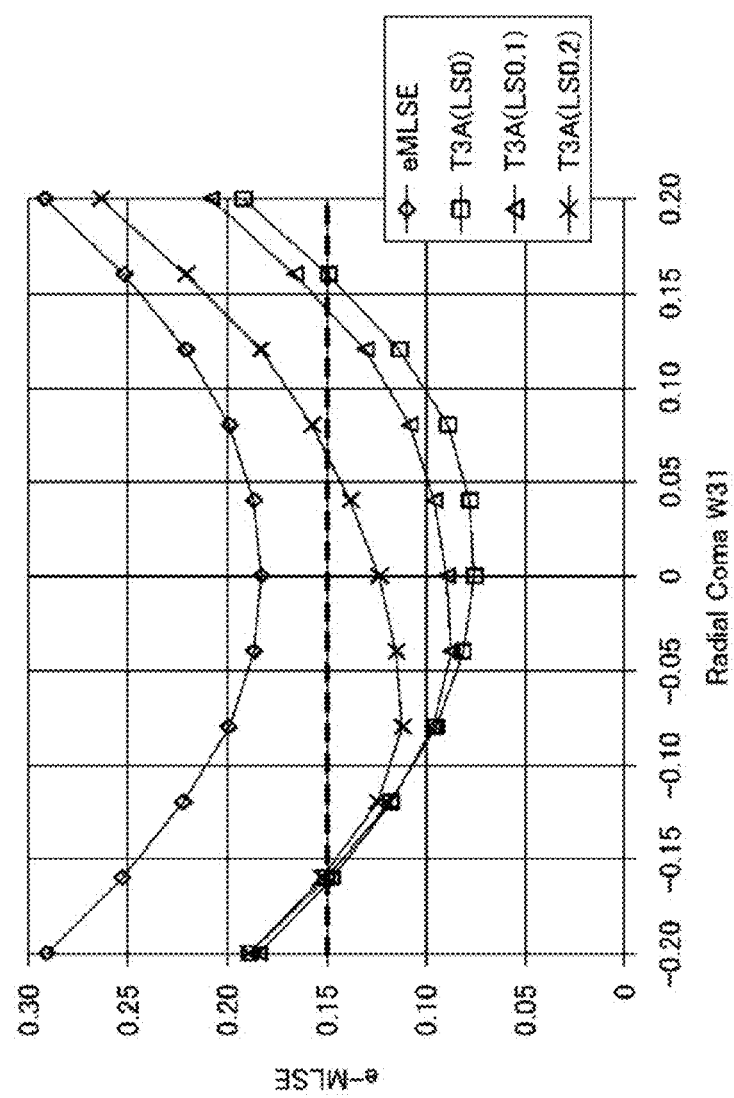

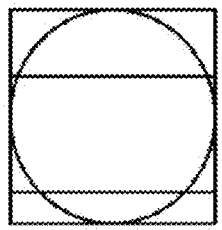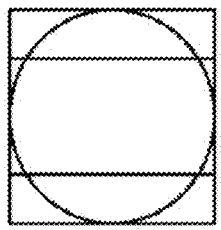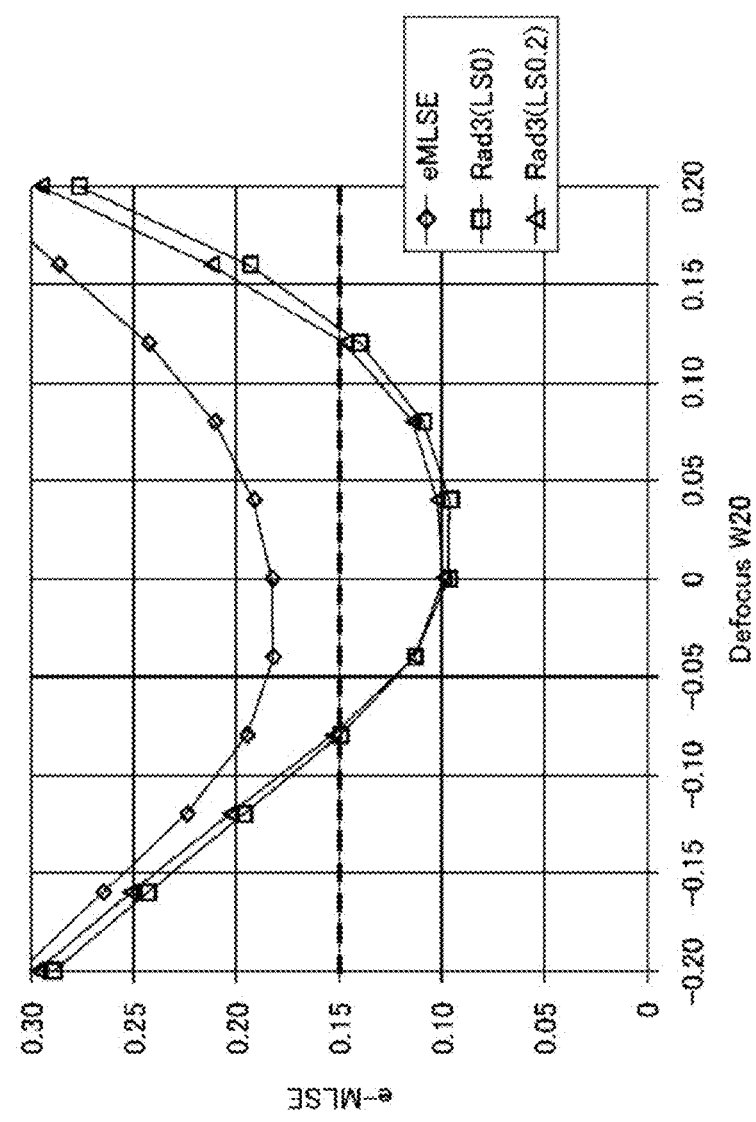
FIG. 29

FIG. 31
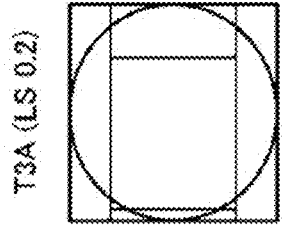
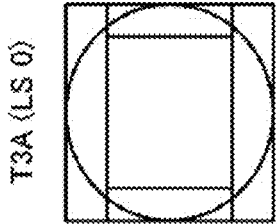
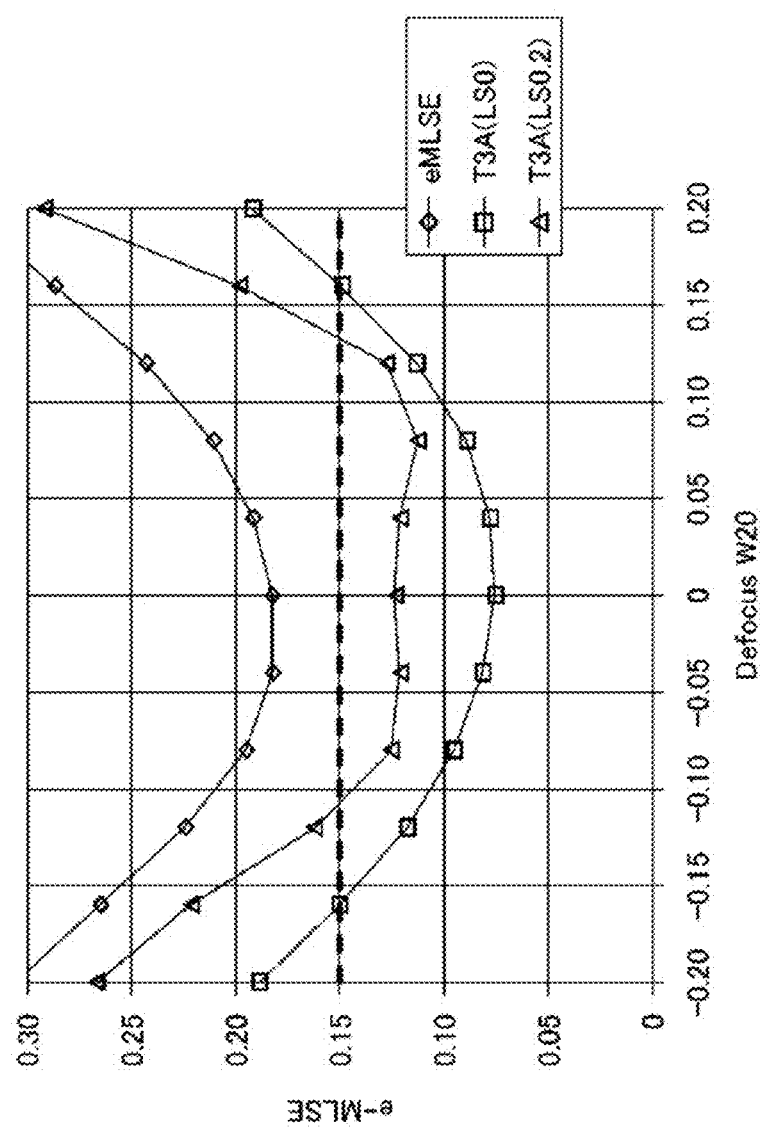

FIG. 32
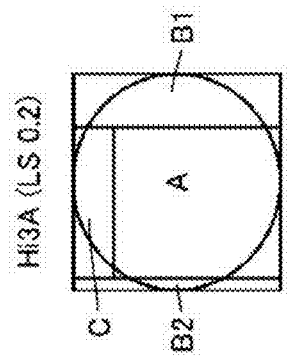 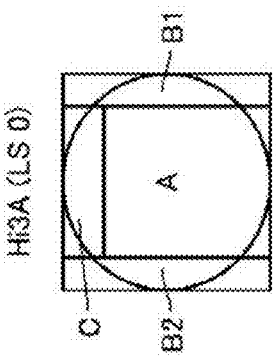 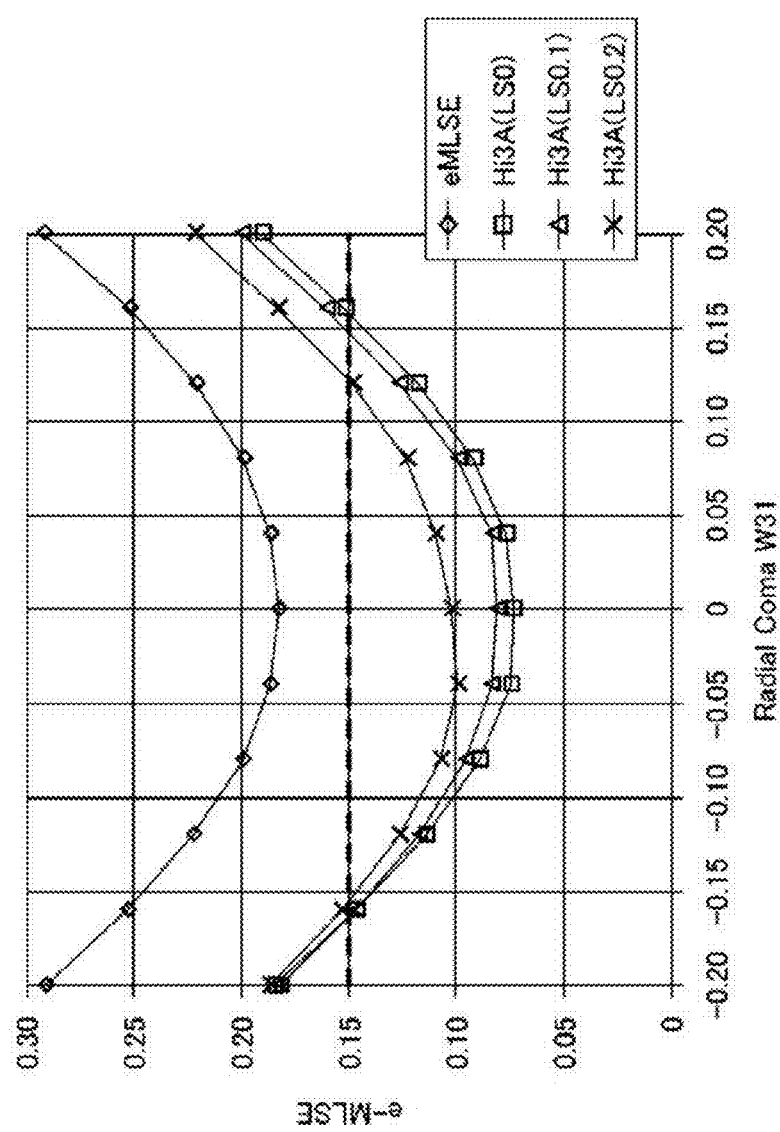

FIG. 34
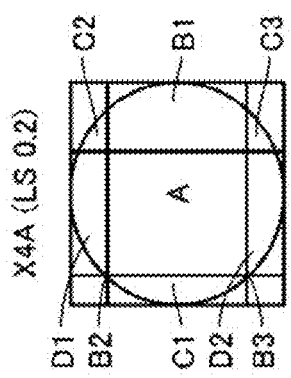
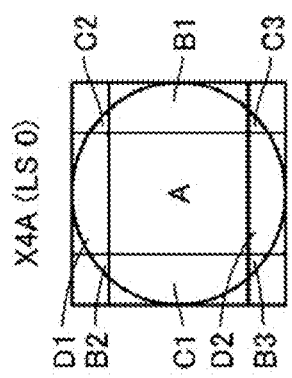
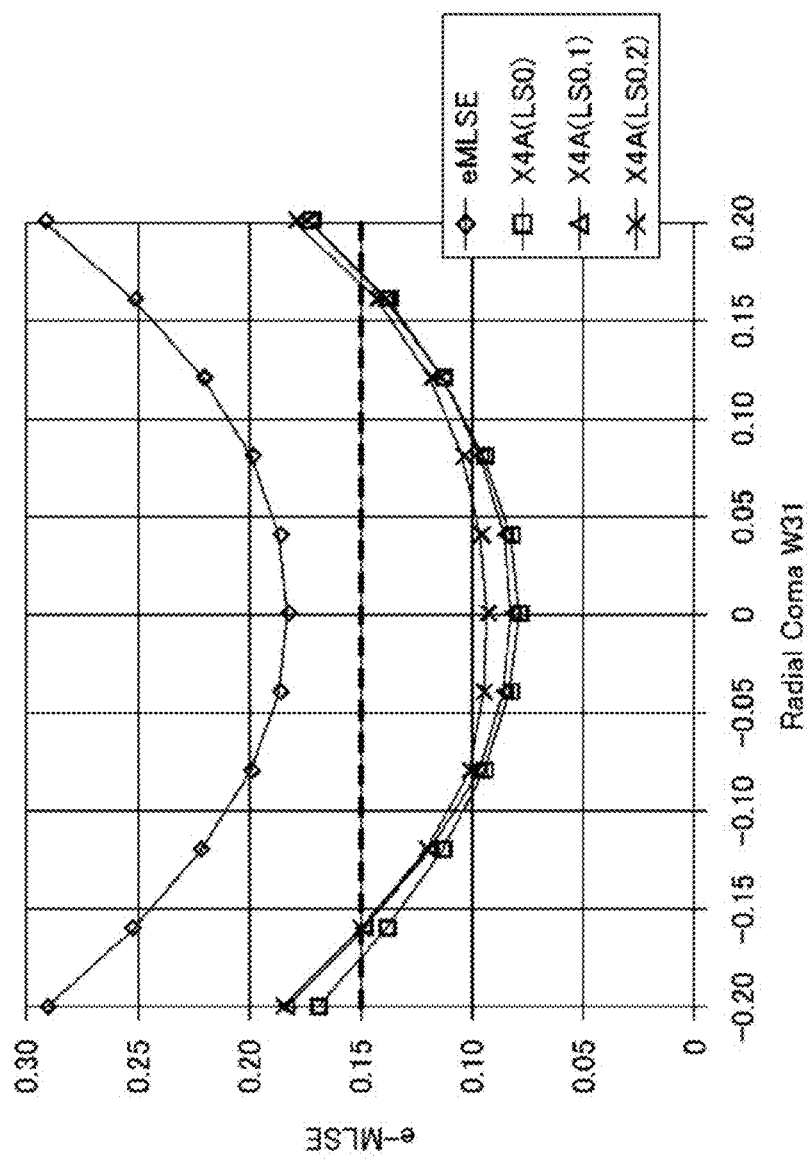

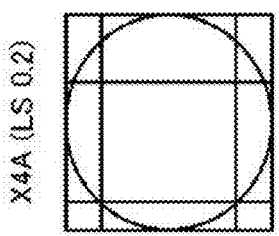
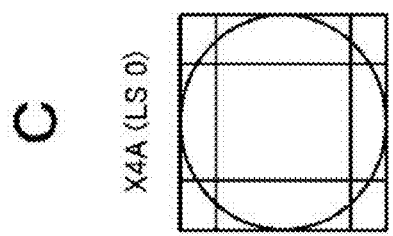
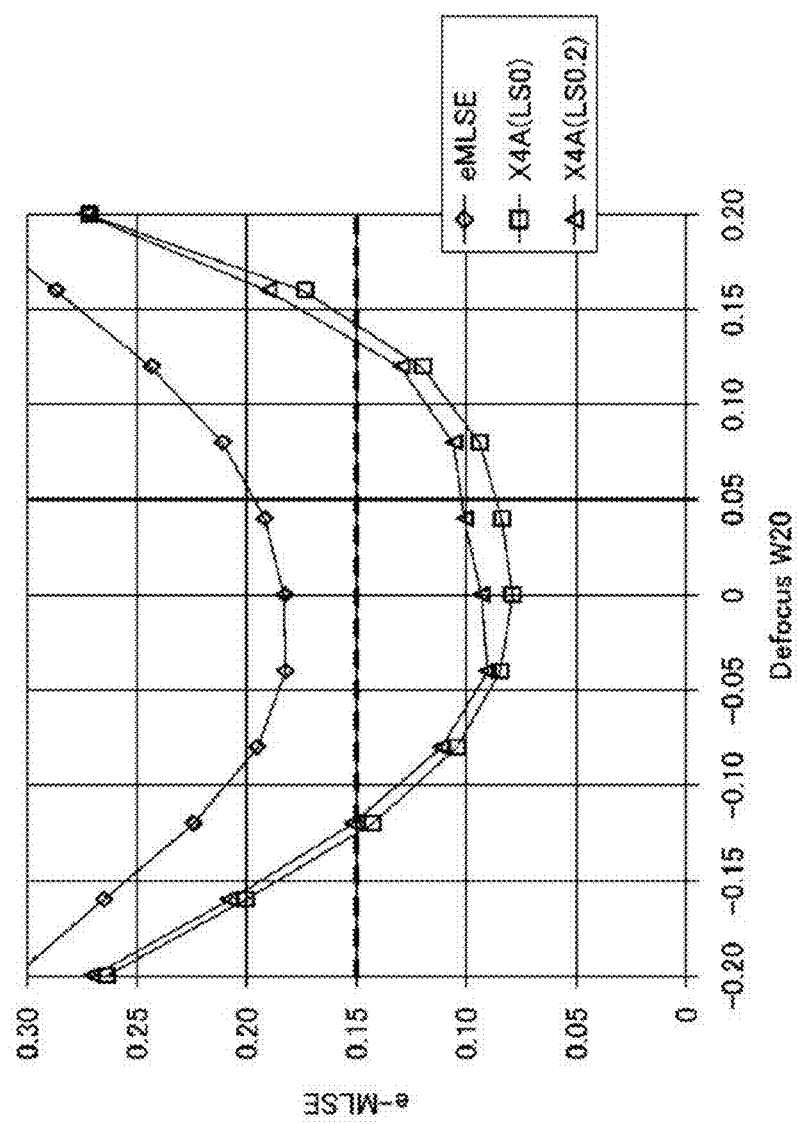
FIG. 35

OPTICAL MEDIUM REPRODUCTION DEVICE AND OPTICAL MEDIUM REPRODUCTION METHOD

CROSS REFERENCE TO RELATED APPLICATIONS

This application claims the benefit under 35 U.S.C. §371 as a U.S. National Stage Entry of International Application No. PCT/JP2014/003412, filed in the Japanese Patent Office as a Receiving Office on Jun. 26, 2014, which claims priority to Japanese Patent Application Number JP2013-168485, filed in the Japanese Patent Office on Aug. 14, 2013, each of which is hereby incorporated by reference in its entirety.

TECHNICAL FIELD

The present disclosure relates to an optical medium reproduction device and an optical medium reproduction method for reproducing an optical medium such as an optical disc.

BACKGROUND ART

As a method for increasing a density of an optical disc, one method is to increase a density in a linear-density direction by reducing a channel bit length, i.e., a mark length, and another method is to make a track pitch narrower. However, in the case where the density is increased in the linear-density direction, inter-symbol interference increases. Meanwhile, in the case where the track pitch is made narrower, leakage of information from an adjacent track (adjacent track crosstalk) increases. Methods for reducing the adjacent track crosstalk (hereinafter, simply referred to as "crosstalk" as appropriate) are proposed.

For example, Patent Literature 1 discloses that crosstalk is canceled by supplying reproduction signals of a track to be reproduced and tracks located on both sides thereof to adaptive equalizer units and controlling tap coefficients of the adaptive equalizer unit.

CITATION LIST

Patent Literature

Patent Literature 1: JP 2012-079385A

SUMMARY OF INVENTION

Technical Problem

According to a technology disclosed in Patent Literature 1, three beams are needed to simultaneously read the track to be reproduced and the tracks located on both sides thereof. Phases of reproduction signals read by the three beams need to be aligned. It is possible to sequentially reproduce three tracks with a single beam and synchronize reproduction signals. A memory for synchronization is needed. Therefore, the technology disclosed in Patent Literature 1 is problematic in that a configuration of an optical pickup is complicated, phase aligning is complicated, and a scale of a circuit is larger. Further, the technology disclosed in Patent Literature 1 does not mention increase in density in a linear-density direction.

Therefore, an object of the present disclosure is to provide an optical medium reproduction device and an optical medium reproduction method capable of canceling crosstalk with the use of a reproduction signal of a single track and increasing a density in a linear-density direction.

Solution to Problem

According to the present disclosure, there is provided an optical medium reproduction device that optically reproduces an optical medium in which a plurality of tracks are provided, the optical medium reproduction device including: a detection unit configured to divide a cross-section of a beam returning from the optical medium into at least one channel corresponding to an outer region in a radial direction, at least one channel corresponding to a region that is different in position in a tangential direction, and a channel corresponding to the other region, and form detection signals of the channels; a multi-input equalizer unit including a plurality of equalizer units to which the detection signals of the plurality of channels are supplied, respectively, the multi-input equalizer unit being configured to calculate outputs of the plurality of equalizer units and output the outputs as an equalized signal in a manner that a phase difference between two of the regions is set to be a predetermined phase difference; and a binarization unit configured to perform a binarization process on the equalized signal to obtain binary data.

Advantageous Effects of Invention

According to the present disclosure, crosstalk can be canceled by using only a reading output of a track to be reproduced. Therefore, it is unnecessary to use three beams for reading, and it is also unnecessary to continuously reproduce three tracks with a single beam and synchronize the three tracks with the use of a memory. Therefore, the present disclosure is advantageous in that a configuration of an optical pickup is not complicated, phase aligning is unnecessary, and the memory is not increased. With this, it is possible to increase a density of an optical disc with a simpler configuration. Further, the present disclosure can increase the density in a radial direction and a linear-density direction. However, effects are not necessarily limited to the effects described herein and may be any effect described in the present disclosure.

BRIEF DESCRIPTION OF DRAWINGS

FIG. 9 is graphs showing tap coefficients and frequency phase characteristics concerning the pattern R2.

FIG. 16 is graphs showing tap coefficients and frequency phase characteristics concerning the pattern H3A.

FIG. 21 is graphs showing tap coefficients and frequency phase characteristics concerning the pattern HT4A.

FIG. 24 is schematic diagrams each of which shows an example influenced by a lens shift.

FIG. 26 is a graph showing an influence of a lens shift upon radial comatic aberration.

FIG. 27 is a graph showing an influence of a lens shift upon radial comatic aberration.

FIG. 28 is a graph showing an influence of a lens shift upon radial comatic aberration.

FIG. 29 is a graph showing an influence of a lens shift upon defocus characteristics.

FIG. 31 is a graph showing an influence of a lens shift upon defocus characteristics.

FIG. 32 is a graph showing an influence of a lens shift upon radial comatic aberration.

FIG. 34 is a graph showing an influence of a lens shift upon radial comatic aberration.

FIG. 35 is a graph showing an influence of a lens shift upon defocus characteristics.

DESCRIPTION OF EMBODIMENTS

The embodiments described below are suitable specific examples of this invention, and includes technically preferred various limitations. However, the scope of this invention is not limited to these embodiments, unless limitations to this invention are particularly stated in the description below.

It is noted that the description below will be provided in the following order.
<1. Embodiment>
<2. Modification example>

1. Embodiment

"Optical Disc Device"

Figure 1:
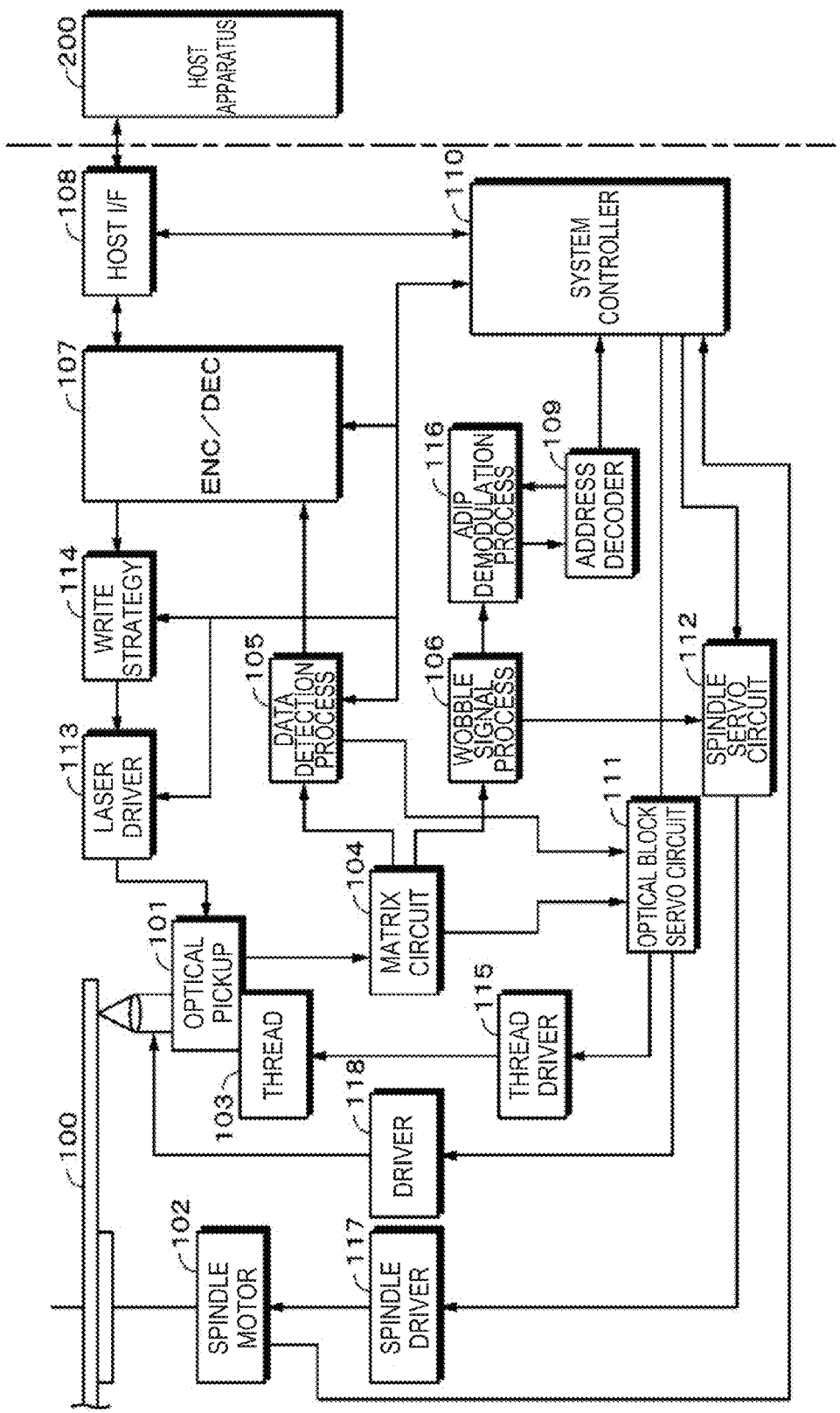
FIG. 1 is a block diagram showing a configuration of an optical disc device according to an embodiment of the present disclosure.

As shown in FIG. 1, an optical disc device to which the present disclosure is applied includes an optical pickup 101 that performs recording and reproduction of information on an optical disc 100 serving as an optical recording medium, and a spindle motor 102 that rotates the optical disc 100. A thread (feeding motor) 103 is provided to move the optical pickup 101 in a diameter direction of the optical disc 100.

As the optical disc 100, a high-density optical disc such as a Blu-ray (registered trademark) Disc (BD) can be used. The BD is a high-density optical disc having a recording capacity of approximately 25 gigabytes with a single layer on one side and a recording capacity of approximately 50 gigabytes with a dual layer on one side. In a BD standard, in order to reduce a beam spot diameter, a wavelength of a light source is set to 405 nm and a numerical aperture (NA) of an objective lens is set to be large, i.e., 0.85. In a CD standard, the wavelength of the light source is 780 nm, NA is 0.45, and the spot diameter is 2.11 µm. In a DVD standard, the wavelength of the light source is 650 nm, NA is 0.6, and the spot diameter is 1.32 µm. In the BD standard, the spot diameter can be reduced to 0.58 µm.

In recent years, there has been implemented BDXL (registered trademark) in which a large capacity of 100 GB is achieved with a triple layer and 128 GB is achieved with a quad layer by reducing a channel bit length, i.e., a mark length and increasing a density in a linear-density direction in the BD (Blu-ray (registered trademark) Disc).

In addition, in order to further increase the recording capacity, it is desirable to use an optical disc in which a method for recording data on both a groove track and a land track (referred to as "land/groove recording method" as appropriate) is adopted. A grooved part is referred to as "groove" and a track formed of a groove is referred to as "groove track". The groove is defined as a part irradiated with laser light when an optical disc is produced. An area between adjacent grooves is referred to as "land", and a track formed of a land is referred to as "land track". In the case of a multilayer optical disc in which a plurality of information recording layers are stacked, the recording capacity can be larger.

In the case where the high-density recordable optical disc 100 is mounted in the optical disc device, the optical disc is rotatably driven by the spindle motor 102 at the time of recording/reproduction at a constant linear velocity (CLU) or a constant angular velocity (CAV). In order to align phases of wobble grooves in a radial direction of the optical disc 100, a CAV or a zone CAV is preferable. At the time of reproduction, mark information recorded on a track of the optical disc 100 is read out by the optical pickup (optical head) 101. At the time of recording data on the optical disc 100, user data is recorded by the optical pickup 101 on the track of the optical disc 100 as a phase change mark or a pigment change mark.

In the case of a recordable disc, a recording mark using the phase change mark is recorded on a track formed of a wobbling groove, and the phase change mark is recorded with a linear density of 0.12 μm/bit and 0.08 μm/channel bit by an RLL (1, 7) PP modulation method (RLL; Run Length Limited, PP: Parity preserve/Prohibit rmtr (repeated minimum transition run-length)) or the like in the case of a BD having 23.3 GB per layer. Similarly, the phase change mark is recorded with a linear density corresponding to 0.0745 μm/channel bit in the case of a BD having 25 GB/layer, the phase change mark is recorded with a linear density corresponding to 0.05826 μm/channel bit in the case of BDXL (registered trademark) having 32 GB/layer, and the phase change mark is recorded with a linear density corresponding to 0.05587 μm/channel bit in the case of BDXL (registered trademark) having 33.4 GB/layer. Thus, the phase change mark is recorded with a density corresponding to the channel bit length in accordance with a type of a disc. Assuming that a channel clock cycle is "T", the mark length falls within a range of 2T to 8T. In the case of a reproduction-only disc, a groove has not been formed, but data modulated by the RLL (1, 7) PP modulation method has been similarly recorded as an embossed pit array.

As reproduction-only management information, for example, physical information of the disc is recorded by the embossed pit or the wobbling groove in an inner circumferential area or the like of the optical disc 100. Reading out of those kinds of information is also performed by the optical pickup 101. Further, reading out of ADIP information embedded as wobbling of the groove track of the optical disc 100 is also performed by the optical pickup 101.

The optical pickup 101 includes, for example, a laser diode serving as a laser light source, a photodetector for detecting reflected light, an objective lens serving as an output end of laser light, and an optical system that irradiates a recording surface of the disc with laser light through the objective lens and leads reflected light thereof to the photodetector. The objective lens is held in the optical pickup 101 to be movable in a tracking direction and a focus direction by a bi-axial mechanism. The entire optical pickup 101 is movable in the radial direction of the disc by the thread mechanism 103. A driving current is supplied to the laser diode of the optical pickup 101 from a laser driver 113, and the laser diode generates laser.

Reflected light from the optical disc 100 is detected by the photodetector and is supplied to a matrix circuit 104 as an electric signal corresponding to an amount of received light. The matrix circuit 104 includes a current/voltage conversion circuit, a matrix calculation/amplification circuit, and the like for output currents from a plurality of light-receiving elements serving as photodetectors and generates a necessary signal by performing a matrix calculation process. The current/voltage conversion circuit may be provided in the photodetector element in consideration of a signal transmission quality. For example, a reproduction information signal (RF signal) corresponding to reproduction data and a focus error signal and a tracking error signal for servo control are generated. Further, a signal related to wobbling of a groove, i.e., a push-pull signal is generated as a signal for detecting wobbling.

The reproduction information signal output from the matrix circuit 104 is supplied to a data detection processing unit 105, the focus error signal and the tracking error signal are supplied to an optical block servo circuit 111, and the push-pull signal is supplied to a wobble signal processing circuit 106.

The data detection processing unit 105 performs a binarization process of the reproduction information signal. For example, the data detection processing unit 105 performs an A/D conversion process of the RF signal, a reproduction clock generation process using PLL, a partial response (PR) equalization process, Viterbi decoding (maximum likelihood decoding), and the like and obtains a binary data string by performing a partial response maximum likelihood decoding process (PRML detection method: partial response maximum likelihood detection method). The data detection processing unit 105 supplies the binary data string, which is information read out from the optical disc 100, to an encoding/decoding unit 107 at a latter stage.

The encoding/decoding unit 107 performs a demodulation process of reproduction data at the time of reproduction and performs a modulation process of record data at the time of recording. That is, the encoding/decoding unit 107 performs data demodulation, de-interleave, ECC decoding, address decoding, and the like at the time of reproduction and performs ECC encoding, interleave, data modulation, and the like at the time of recording.

At the time of reproduction, the binary data string decoded in the data detection processing unit 105 is supplied to the encoding/decoding unit 107. The encoding/decoding unit 107 performs a demodulation process on the binary data string and therefore obtains reproduction data from the optical disc 100. That is, for example, the encoding/decoding unit 107 performs a demodulation process and an ECC decoding process for correcting errors on data which has been subjected to run-length limited code modulation such as RLL (1, 7) PP modulation and has been recorded on the optical disc 100 and therefore obtains reproduction data from the optical disc 100.

Data decoded as the reproduction data in the encoding/decoding unit 107 is transmitted to a host interface 108 and is transmitted to a host apparatus 200 in response to an instruction of a system controller 110. The host apparatus 200 is, for example, a computer device or an audio-visual (AV) system apparatus.

When recording/reproduction is performed on the optical disc 100, processing of ADIP information is performed. That is, the push-pull signal that is output from the matrix circuit 104 as a signal related to wobbling of a groove is converted into digitalized wobble data in the wobble signal processing circuit 106. A clock synchronized with the push-pull signal is generated by a PLL process. The wobble data is demodulated to a data stream forming an ADIP address in an ADIP demodulation processing unit 116 and is supplied to an address decoder 109. The address decoder 109 decodes the supplied data to obtain an address value and supplies the address value to the system controller 110.

At the time of recording, record data is transmitted from the host apparatus 200, and the record data is supplied to the encoding/decoding unit 107 via the host interface 108. The encoding/decoding unit 107 performs, as an encoding process of record data, addition of an error correcting code (ECC encoding), interleave, addition of a subcode, and the like. The data subjected to those processes is subjected to run-length limited code modulation such as the RLL (1-7) PP method.

The record data processed in the encoding/decoding unit 107 is supplied to a write strategy unit 114. The write strategy unit 114 performs, as a recording compensation process, laser driving pulse waveform adjustment on characteristics of a recording layer, a spot shape of laser light, a recording linear velocity, and the like. Then, a laser driving pulse is output to the laser driver 113.

The laser driver 113 supplies a current to the laser diode in the optical pickup 101 on the basis of the laser driving pulse subjected to the recording compensation process and emits laser light. Thus, a mark corresponding to the record data is formed on the optical disc 100.

The optical block servo circuit 111 generates various servo drive signals such as focus, tracking, and thread drive signals in accordance with the focus error signal and the tracking error signal supplied from the matrix circuit 104 and performs servo operation. That is, the optical block servo circuit 111 generates a focus drive signal and a tracking drive signal in accordance with the focus error signal and the tracking error signal, and a driver 118 drives a focus coil and a tracking coil of the bi-axial mechanism in the optical pickup 101. Thus, a tracking servo loop and a focusing servo loop are formed by the optical pickup 101, the matrix circuit 104, the optical block servo circuit 111, the driver 118, and the bi-axial mechanism.

In response to a track jump instruction from the system controller 110, the optical block servo circuit 111 performs track jump operation by turning off the tracking servo loop and outputting a jump drive signal. Further, the optical block servo circuit 111 generates a thread drive signal on the basis of a thread error signal obtained as a low frequency component of the tracking error signal, access execution control of the system controller 110, and the like, and then a thread driver 115 drives the thread mechanism 103.

A spindle servo circuit 112 performs control for CLV-rotating or CAV-rotating the spindle motor 102. The spindle servo circuit 112 generates a spindle error signal by obtaining, as current rotation speed information of the spindle motor 102, the clock generated by PLL for a wobble signal and comparing the clock with predetermined reference speed information. At the time of reproduction of data, a reproduction clock generated by PLL in the data detection processing unit 105 is the current rotation speed information of the spindle motor 102, and therefore the spindle error signal is generated by comparing the rotation speed information with the predetermined reference speed information. Then, the spindle servo circuit 112 outputs a spindle drive signal generated in accordance with the spindle error signal, thereby causing a spindle driver 117 to perform CLV-rotation or CAV-rotation of the spindle motor 102.

The spindle servo circuit 112 generates the spindle drive signal in accordance with a spindle kick/brake control signal supplied from the system controller 110 and also performs operation such as start, stop, acceleration, and deceleration of the spindle motor 102.

Various kinds of operation in such a servo system and a recording/reproduction system are controlled by the system controller 110 including a microcomputer. The system controller 110 performs various processes in response to commands supplied from the host apparatus 200 via the host interface 108. For example, in the case where a write command is transmitted from the host apparatus 200, the system controller 110 moves the optical pickup 101 to an address where writing is to be performed. Then, the system controller 110 causes the encoding/decoding unit 107 to perform the encoding process on data (for example, video data or audio data) transmitted from the host apparatus 200 as described above. Then, the laser driver 113 drives emission of laser light in accordance with the encoded data. In this way, recording is performed.

For example, in the case where a read command for requesting transmission of certain data recorded on the optical disc 100 is supplied from the host apparatus 200, the system controller 110 controls seek operation for the specified address. That is, the system controller 110 transmits an instruction to the optical block servo circuit 111 and causes the optical pickup 101 to perform access operation by using the address specified by a seek command as a target. Thereafter, the system controller 110 performs operation control needed to transmit data in such a specified data section to the host apparatus 200. That is, the system controller 110 reads out data from the optical disc 100, causes the data detection processing unit 105 and the encoding/decoding unit 107 to perform reproduction processes, and transmits required data.

Although the optical disc device connected to the host apparatus 200 has been described in the example of FIG. 1, the optical disc device may or may not be connected to another apparatus. In that case, an operation unit and a display unit are provided, and a configuration of an interface part via which data is input/output differs from that in FIG. 1. That is, it is only necessary to perform recording and reproduction in accordance with user's operation and provide a terminal portion for inputting/outputting various kinds of data. As a matter of course, other various configuration examples of the optical disc device are conceivable.

"Optical Pickup"

The optical pickup 101 for use in the above optical disc device will be described with reference to FIG. 2. The optical pickup 101 records information on the optical disc 100 and reproduces the information from the optical disc 100 with the use of, for example, laser light (beam) having a wavelength $\lambda$ of 405 nm. Laser light is emitted from a semiconductor laser (LD: laser diode) 1.

The optical disc 100 is irradiated with laser light that has passed through a collimator lens 2, a polarizing beam splitter (PBS) 3, and an objective lens 4. The polarizing beam splitter 3 has a separation surface that, for example, allows p-polarized light to be transmitted therethrough substantially 100% and reflects s-polarized light substantially 100%. Reflected light from a recording layer of the optical disc 100 returns through the same optical path and is incident on the polarizing beam splitter 3. By providing a $\lambda/4$ element (not shown) therebetween, the incident laser light is reflected by the polarizing beam splitter 3 substantially 100%.

The laser light reflected by the polarizing beam splitter 3 is condensed on a light-receiving surface of a photodetector 6 through a lens 5. The photodetector 6 includes, on the light-receiving surface, a light-receiving cell that performs photoelectric conversion on incident light. The light-receiving cell is divided into a plurality of regions by dividing lines that extend in the radial direction (diameter direction of disc) and/or a tangential direction (track direction) of the optical disc 100. The photodetector 6 outputs electric signals of a plurality of channels in accordance with light-receiving amounts of the respective regions of the light-receiving cell. A method for dividing a region will be described below.

Figure 2:
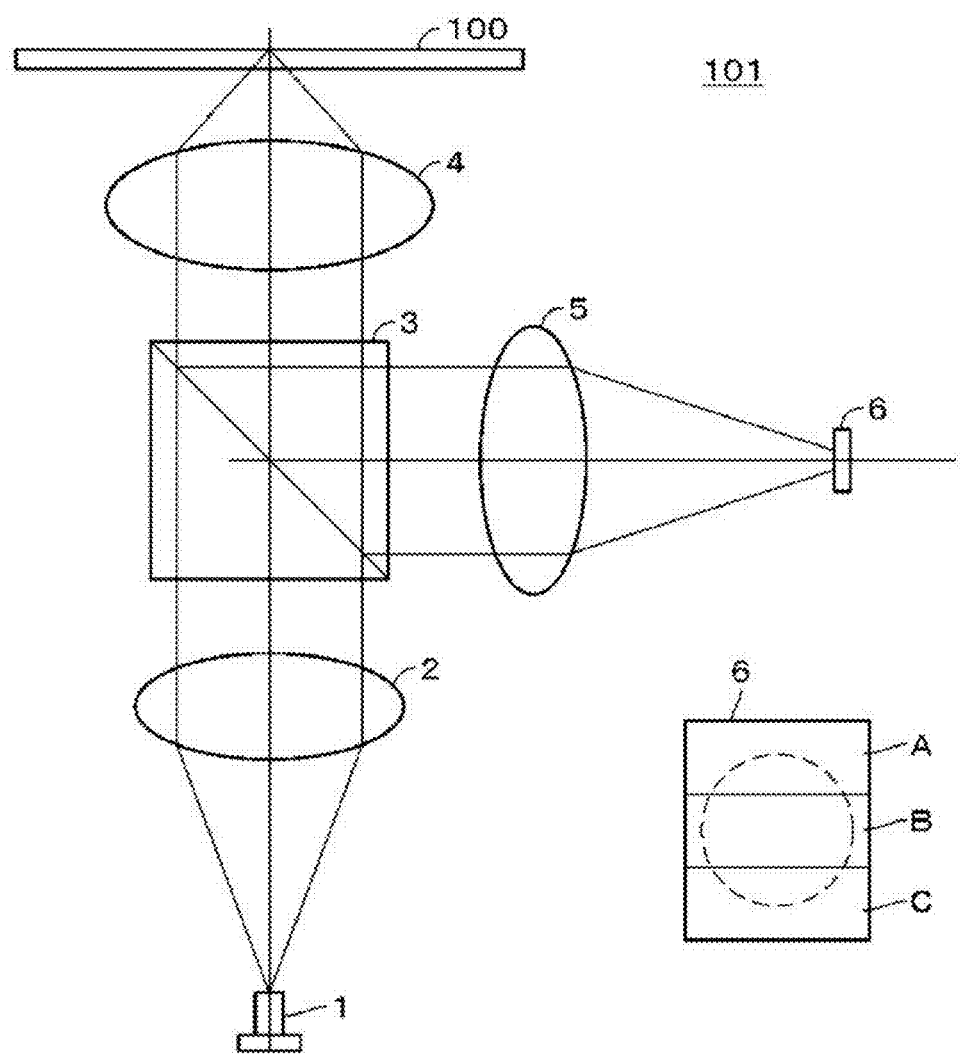
FIG. 2 is a schematic diagram showing a configuration of an optical pickup in an embodiment of the present disclosure.

The configuration of the optical pickup 101 of FIG. 2 includes minimum constituent elements for describing the present disclosure, and, for example, the focus error signal and the tracking error signal output to the optical block servo circuit 111 via the matrix circuit 104 and a signal for generating the push-pull signal output to the wobble signal processing circuit 106 via the matrix circuit 104 are not shown. In addition, various configurations other than the configuration shown in FIG. 2 are possible.

In the present disclosure, a cross-section of a luminous flux of a returning beam from the optical disc 100 is divided into a plurality of regions, and therefore reproduction information signals of the plurality of channels corresponding to the regions are obtained. As a method for obtaining a reproduction information signal in each region, a method other than the method for dividing the photodetector 6 can be used. For example, the following method may be used: an optical path conversion element for separating a plurality of regions is provided in an optical path leading to the photodetector 6 through the objective lens 4, and a plurality of beams separated by the optical path conversion element are supplied to different photodetectors. The optical path conversion element can be a diffraction element such as a holographic optical element or a refractive element such as a microlens array or microprism.

"Data Detection Processing Unit"

Figure 3:
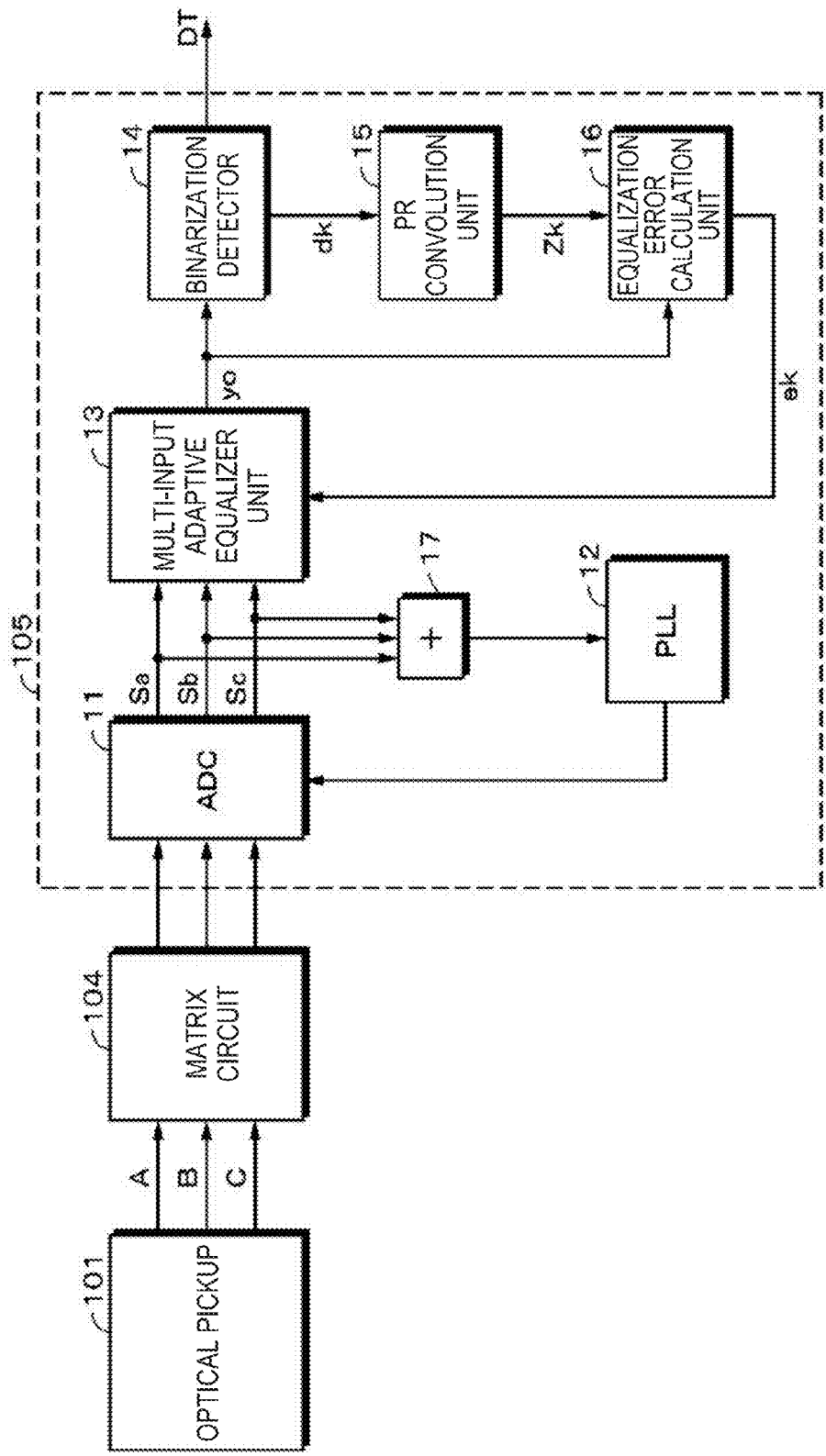
FIG. 3 is a block diagram of an example of a data detection processing unit in an embodiment.
Figure 4:
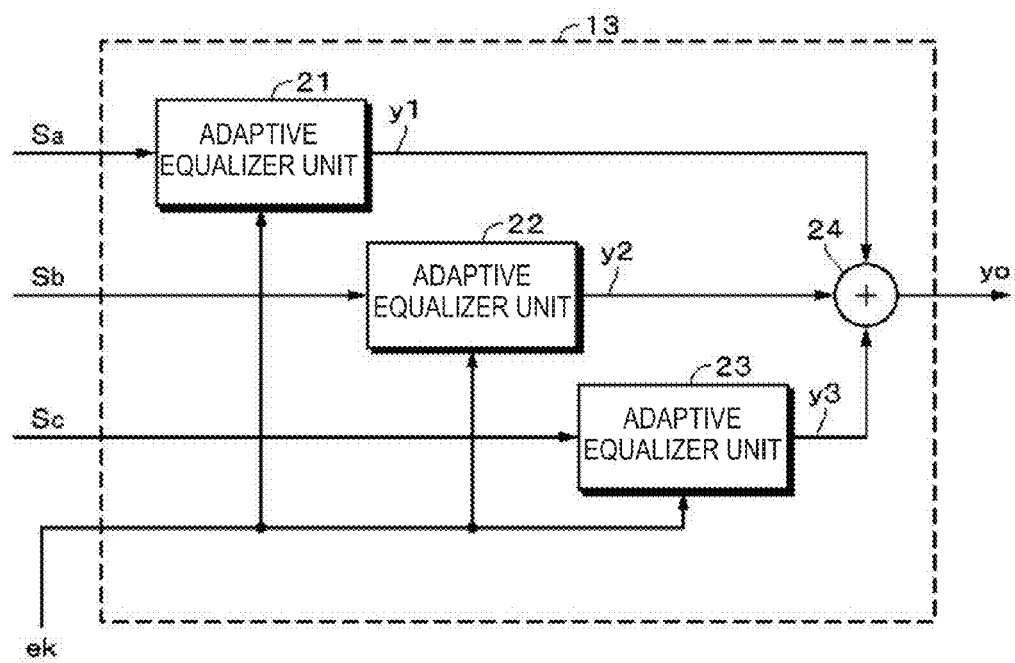
FIG. 4 is a block diagram of an example of a multi-input adaptive equalizer in the data detection processing unit.

As described above, detection signals, which are reproduced from the optical disc 100 by the optical pickup 101 and correspond to the regions, are supplied to the matrix circuit 104 and are converted into reproduction information signals of the plurality of channels corresponding to the regions. As shown in FIG. 3, the data detection processing unit 105 includes an A/D converter 11 to which reproduction information signals supplied from the matrix circuit 104 are supplied. FIG. 3 and FIG. 4 show an example where a cross-section of a luminous flux of a returning beam from the optical disc 100 is divided into, for example, three regions and reproduction information signals of three channels are obtained from the matrix circuit 104.

A clock for the A/D converter 11 is made up of a PLL 12. The reproduction information signals supplied from the matrix circuit 104 are converted into digital data in the A/D converter 11. The digitalized reproduction information signals of the three channels in regions A to C are denoted by Sa to Sc. A signal obtained by adding the reproduction information signals Sa to Sc in an adder circuit 17 is supplied to the PLL 12.

The data detection processing unit 105 further includes a multi-input adaptive equalizer unit 13, a binarization detector 14, a PR convolution unit 15, and an equalization error calculation unit 16. The multi-input adaptive equalizer unit 13 performs a PR adaptive equalization process on each of the reproduction information signals Sa to Sc. That is, the reproduction information signals Sa to Sc are equalized to be approximate to a target PR waveform. Equalized outputs are added and an equalized signal y0 is output.

As a signal to be input to the PLL 12, output of the multi-input adaptive equalizer unit may be used. In this case, an initial coefficient of the multi-input adaptive equalizer is set to a value determined in advance.

The binarization detector 14 is, for example, a Viterbi decoder and performs a maximum likelihood decoding process on the equalized signal y0 that has been subjected to PR equalization, thereby obtaining binarized data DT. The binarized data DT is supplied to the encoding/decoding unit 107 shown in FIG. 1 and is subjected to a reproduction data demodulation process. In Viterbi decoding, a Viterbi detector configured by a plurality of states formed by using consecutive bits having a predetermined length as a unit and branches expressed by transitions therebetween is used and effectively detects a desired bit sequence among all possible bit sequences.

In an actual circuit, two registers, i.e., a register referred to as a path metric register and a register referred to as a path memory register are provided for each state. The path metric register stores a partial response sequence leading to the state and a path metric of a signal. The path memory register stores a flow of a bit sequence leading to the state. Further, a calculation unit referred to as a branch metric unit, which calculates a partial response sequence in the bit and a path metric of a signal, is provided for each branch.

The Viterbi decoder can associate various bit sequences in one-to-one correspondence by using one of paths passing a state. A path metric between a partial response sequence passing those paths and an actual signal (reproduction signal) is obtained by sequentially adding inter-state transitions forming the above paths, that is, by sequentially adding the above branch metrics in the branches.

A path achieving a smallest path metric can be selected by comparing magnitudes of path metrics that two branches or less reached in each state have and sequentially selecting a path having a smaller path metric. By transmitting this selection information to the path memory register, information expressing a path reaching each state with a bit sequence is stored. A value of the path memory register is sequentially updated and is finally converged to a bit sequence achieving a smallest path metric, and a result thereof is output.

The PR convolution unit 15 generates a target signal Zk by performing a convolution process of a binarization result as represented by the following expression. The target signal Zk is an ideal signal having no noise because the target signal Zk is obtained by convoluting a binarization detection result. For example, in the case of PR (1, 2, 2, 2, 1), a value P for each channel clock is (1, 2, 2, 2, 1). A constraint length thereof is 5. In the case of PR (1, 2, 3, 3, 3, 2, 1), the value P for each channel clock is (1, 2, 3, 3, 3, 2, 1). A constraint length thereof is 7. In the case where laser light has a wavelength λ=405 nm, the objective lens has NA=0.85, a track pitch is constantly 0.32 μm, and a recording density is increased so that a capacity exceeds 35 GB, detection is difficult unless a detection ability is increased by increasing the constraint length of the partial response from 5 to 7. In the following expression, d denotes binarized data.

[Math 1]

$$Z_n = \sum_m P_m d_{n-m} \quad (1)$$
$$P = (1, 2, 3, 3, 3, 2, 1)$$
$$P = (1, 2, 2, 2, 1)$$

Figure 6:
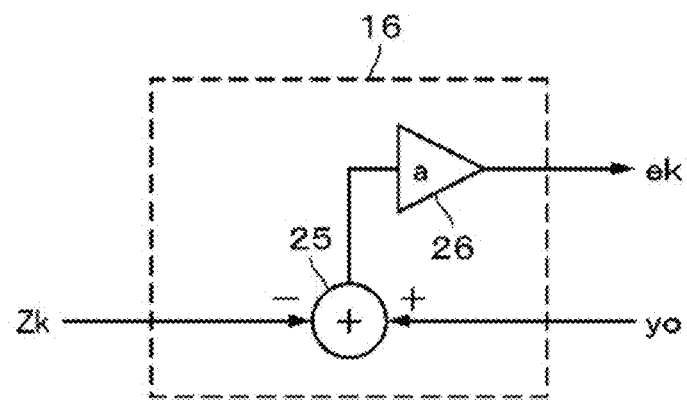
FIG. 6 is a block diagram of an example of an equalization error calculation unit.

The equalization error calculation unit 16 calculates an equalization error ek on the basis of the equalized signal y0 supplied from the multi-input adaptive equalizer unit 13 and the target signal Zk and supplies the equalization error ek to the multi-input adaptive equalizer unit 13 in order to perform tap coefficient control. As shown in FIG. 6, the equalization error calculation unit 16 includes a subtractor 25 and a coefficient multiplier 26. The subtractor 25 subtracts the target signal Zk from the equalized signal y0. The coefficient multiplier 26 multiplies a result of this subtraction by a predetermined coefficient a. As a result, the equalization error ek is generated.

As shown in FIG. 4, the multi-input adaptive equalizer unit 13 includes adaptive equalizer units 21, 22, and 23 and an adder 24. The above reproduction information signal Sa is input to the adaptive equalizer unit 21, the reproduction information signal Sb is input to the adaptive equalizer unit 22, and the reproduction information signal Sc is input to the adaptive equalizer unit 23. FIG. 4 shows a configuration of the multi-input adaptive equalizer unit 13 obtained in the case where the region division number is 3. The adaptive equalizer units are provided to correspond to the region division number.

Each of the adaptive equalizer units 21, 22, and 23 has parameters of the finite impulse response (FIR) filter tap number, calculation accuracy (bit resolution) thereof, and an update gain of adaptive calculation, and optimal values are set for each equalizer unit. The equalization error ek is supplied to each of the adaptive equalizer units 21, 22, and 23 as a coefficient control value for adaptive control.

Outputs y1, y2, and y3 of the adaptive equalizer units 21, 22, and 23 are added in the adder 24 to be output as the equalized signal y0 of the multi-input adaptive equalizer unit 13. An output target of the multi-input adaptive equalizer unit 13 is an ideal PR waveform obtained by convoluting a binarization detection result in PR (partial response).

Figure 5:
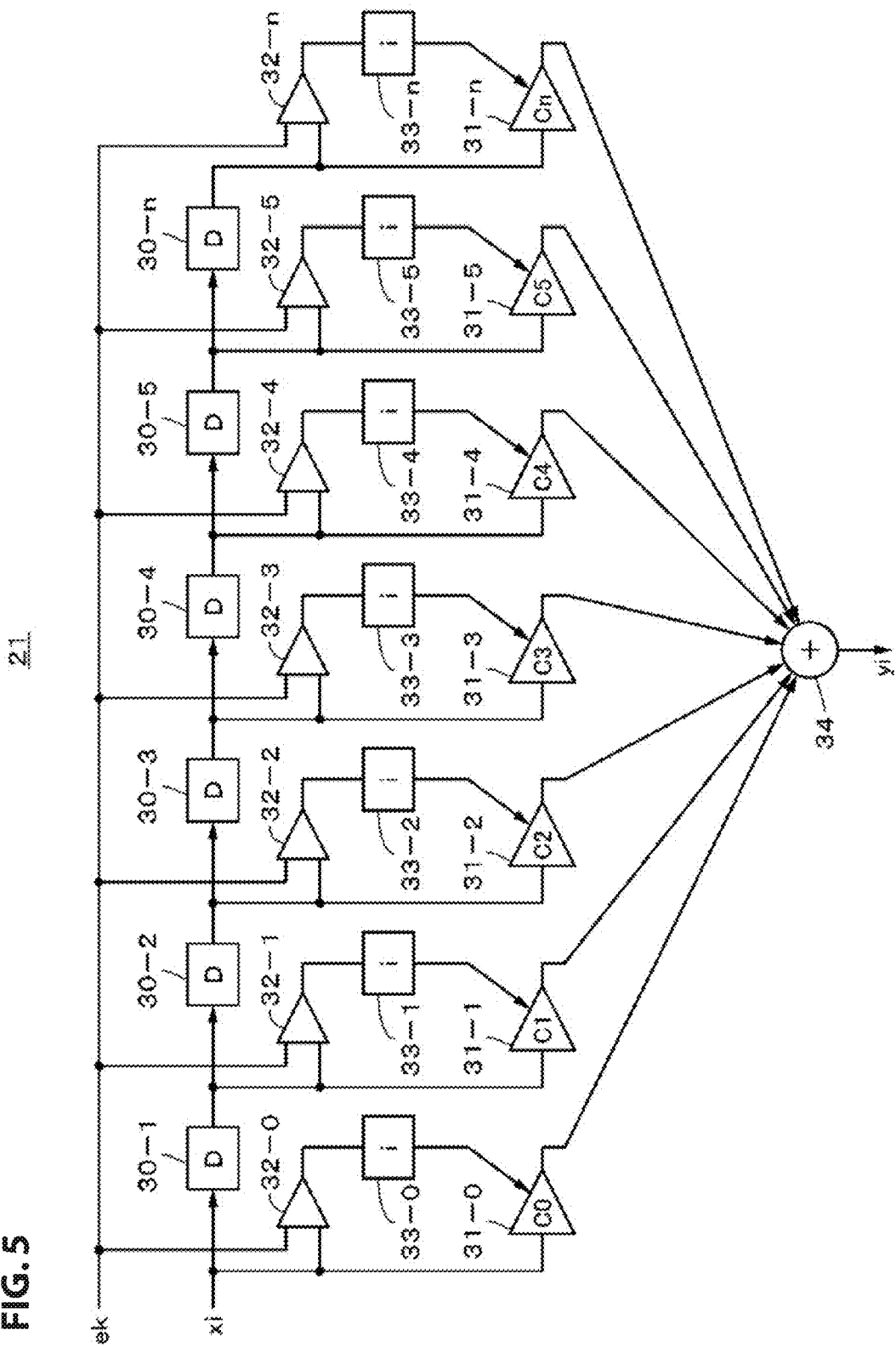
FIG. 5 is a block diagram of an example of the multi-input adaptive equalizer.

The adaptive equalizer unit 21 includes, for example, an FIR filter as shown in FIG. 5. The adaptive equalizer unit 21 is a filter having taps of n+1 stages including delay elements 30-1 to 30-$n$, coefficient multipliers 31-0 to 31-$n$, and an adder 34. The coefficient multipliers 31-0 to 31-$n$ multiply tap coefficients C0 to Cn by an input x at each point of time. Outputs of the coefficient multipliers 31-0 to 31-$n$ are added in the adder 34 and are extracted as an output y.

In order to perform an adaptive equalization process, the tap coefficients C0 to Cn are controlled. For this purpose, calculators 32-0 to 32-$n$, each of which receives the equalization error ek and each tap input and performs calculation, are provided. Further, integrators 33-0 to 33-$n$ that integrate outputs of the calculators 32-0 to 32-$n$ are provided. In each of the calculators 32-0 to 32-$n$, for example, $-1 \times ek \times x$ is calculated. Outputs of the calculators 32-0 to 32-$n$ are integrated in the integrators 33-0 to 33-$n$, respectively, and the tap coefficients C0 to Cn of the coefficient multipliers 31-0 to 31-$n$ are controlled to be changed on the basis of a result of this integration. The integrators 33-0 to 33-$n$ are integrated to adjust responsiveness of adaptive coefficient control.

In the data detection processing unit 105 having the above configuration, unnecessary signals such as crosstalk are reduced and binarized data is decoded.

The adaptive equalizer units 22 and 23 have a configuration similar to that of the adaptive equalizer unit 21. The adaptive equalizer units 21, 22, and 23 are supplied with the common equalization error ek and perform adaptive equalization. That is, the adaptive equalizer units 21, 22, and 23 optimize errors of input signal frequency components and phase distortion of the reproduction information signals Sa, Sb, and Sc, i.e., perform adaptive PR equalization. That is, the tap coefficients C0 to Cn are adjusted on the basis of a result of calculation of $-1 \times ek \times x$ in the calculators 32-0 to 32-$n$. This means that the tap coefficients C0 to Cn are adjusted to correct the equalization error.

Thus, the adaptive equalizer units 21, 22, and 23 perform adaptive control with the use of the equalization error ek so that the tap coefficients C0 to Cn have target frequency characteristics. The equalized signal y0 of the multi-input adaptive equalizer unit 13, which is obtained by adding the outputs y1, y2, and y3 of the adaptive equalizer units 21, 22, and 23 in the adder 24, is a signal having reduced crosstalk and the like.

"Patterns of Region Division"

Figure 7:
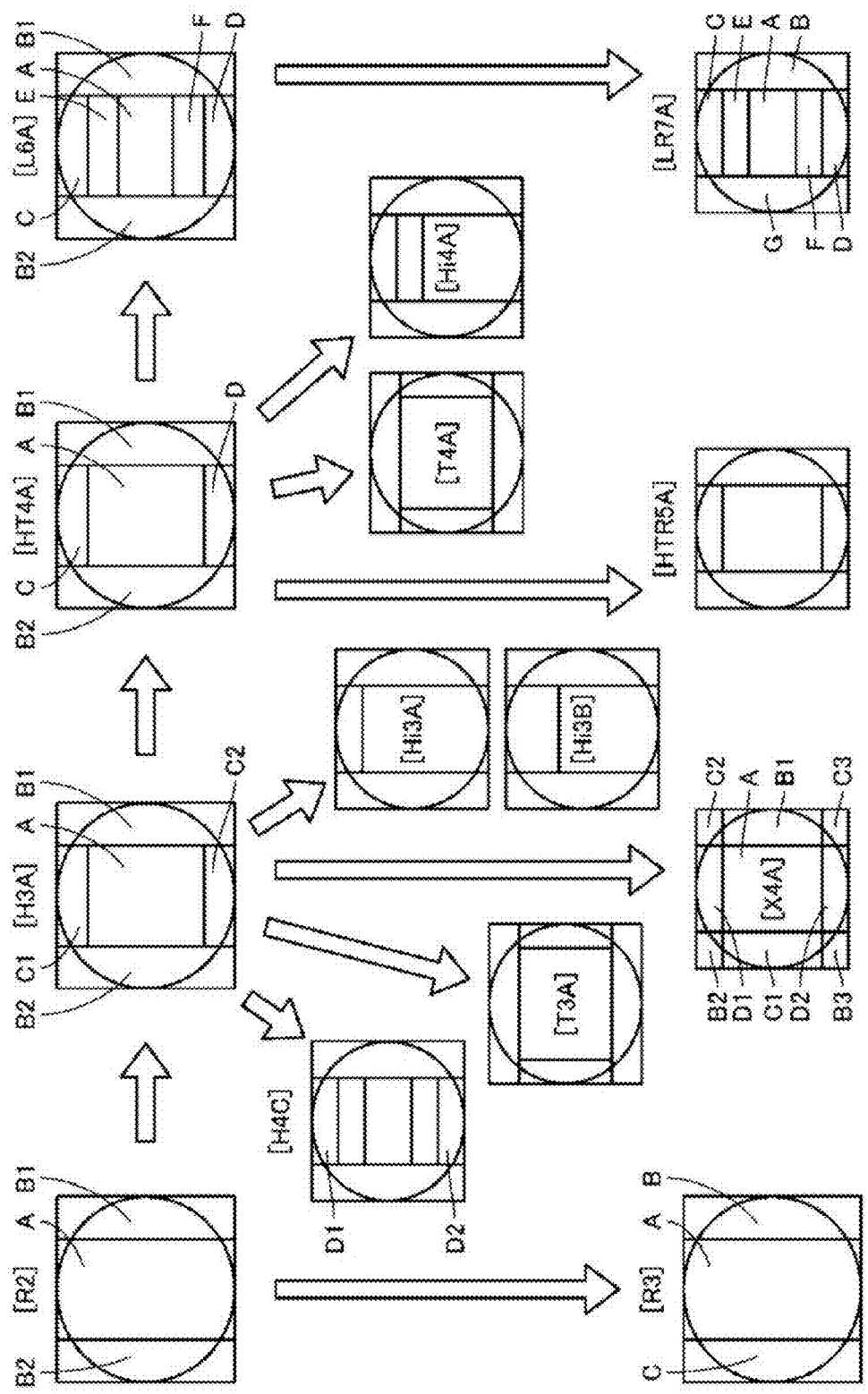
FIG. 7 is a schematic diagram for explaining a plurality of examples of a pattern of region division.

Exemplary patterns of region division in this specification will be described. As shown in FIG. 7, there are a plurality of patterns for dividing a cross-sectional region of a luminous flux of a beam returning from the optical disc 100. Each pattern will be described. A circle in FIG. 7 indicates a circumference of a cross-section of a luminous flux of a beam. A square indicates an area of a light-receiving cell of, for example, a photodetector for detection. A vertical direction of this region division diagram corresponds to a tangential direction of a returning luminous flux, and a horizontal direction thereof corresponds to a radial direction thereof. Region division patterns shown in FIG. 7 are merely examples, and patterns other than those shown in FIG. 7 are also possible. For example, a dividing line is not limited to a straight line and may be a curved line such as an arc.

Pattern R2

The pattern R2 is an example where a beam is divided in the radial direction into two regions, i.e., a region A and a region B (=B1+B2) by two dividing lines extending in the tangential direction. Electric signals corresponding to light-receiving signals in the regions B1 and B2 are added to be a signal of a channel. That is, an example of FIG. 3 is an example of two channels, i.e., an inner channel (region A) and an outer channel (regions B1+B2). Such region division is referred as the pattern R2.

Pattern R3

In the pattern R2, two outer regions are defined as regions B and C of different channels. A pattern of such region division is referred to as R3. Signals of three channels corresponding to three regions are obtained.

Pattern H3A

As compared with the pattern R2, the pattern H3A is a pattern in which the region A is vertically divided by dividing lines extending in the radial direction. Regions C1 and C2 are provided on upper and lower sides in the tangential direction, and the remaining central region is defined as A. That is, the pattern H3A is a pattern in which the cross-section of the beam is divided into three regions, i.e., the region A, the region (B1+B2), and the region C (=C1+C2). Signals of three channels corresponding to the three regions are obtained.

Pattern H4C

In the pattern H4C, regions D1 and D2 are provided by dividing each of the upper and lower regions C1 and C2 of the pattern H3A into two parts in the tangential direction. That is, the pattern H4C is a pattern in which the cross-section of the beam is divided into four regions, i.e., the region A, the region (B1+B2), the region C(=C1+C2), and a region D (=D1+D2). Signals of four channels corresponding to the four regions are obtained.

Pattern T3A

The pattern T3A is a pattern obtained by extending the upper and lower regions C1 and C2 of the pattern H3A to cover the regions B1 and B2. The pattern T3A is a pattern in which the cross-section of the beam is divided into three regions, i.e., the region A, the region (B1+B2), and the region C (=C1+C2). Signals of three channels corresponding to the three regions are obtained.

Pattern X4A

The pattern X4A is a pattern in which regions B2, B3, C2, and C3 are provided at four corners by extending the dividing lines that divide the region A in the tangential direction in the pattern H3A. The pattern X4A is a pattern in which the cross-section of the beam is divided into four regions, i.e., the region A, the region (B1+B2+B3), the region C (=C1+C2+C3), and the region D (D1+D2). Signals of four channels corresponding to the four regions are obtained.

Pattern Hi3A

The pattern Hi3A is a pattern obtained by reducing the dividing lines, i.e., providing a single dividing line in the tangential direction in the pattern H3A so that one of the upper and lower regions C1 and C2, i.e., the region C2 is not provided. As a result, a central position of the central region A is shifted downward in the tangential direction from a central position of the cross-section of the beam. Thus, signals of three channels including two channels that are different in central position in the tangential direction are obtained.

Pattern Hi3B

The pattern Hi3B is obtained by dividing a region in the same way as the pattern Hi3A. However, a width of the upper region C1 is larger than that of the pattern Hi3A.

Pattern HT4A

The pattern HT4A is a pattern in which the region C2 of the pattern H3A is defined as a region D of a fourth channel. The pattern HT4A is a pattern in which the cross-section of the beam is divided into four regions, i.e., the region A, the region (B 1+B2), the region C, and the region D. Signals of four channels corresponding to the four regions and including three channels that are different in central position in the tangential direction are obtained.

HTR5A

The pattern HTR5A is a pattern in which the two outer regions B1 and B2 in the radial direction in the pattern HT4A are defined as regions of different channels, and signals of five channels are obtained.

Pattern T4A

The pattern T4A is a pattern obtained by extending the upper and lower regions C and D of the pattern HT4A to cover the regions B1 and B2. The pattern T4A is a pattern in which the cross-section of the beam is divided into four regions, i.e., the region A, the region (B1+B2), the region C, and the region D. Signals of four channels corresponding to the four regions and including three channels that are different in central position in the tangential direction are obtained.

Pattern Hi4A

The pattern Hi4A is a pattern obtained by providing a region D below and adjacent to the region C in the pattern HT4A. As a result, the central position of the central region A is shifted downward in the tangential direction from the central position of the cross-section of the beam. Signals of four channels including three channels that are different in central position in the tangential direction are obtained.

Pattern L6A

The upper and lower regions of the pattern HT4A are defined as C and D, respectively. An adjacent region E is provided below C, and an adjacent region F is provided above D. Signals of six channels including five channels that are different in central position in the tangential direction are obtained from the regions A to F.

Pattern LR7A

The pattern LR7A is a pattern in which the region B1 of the pattern L6A is defined as the region B and the region B2 of the pattern L6A is defined as a region G. Signals of seven channels are obtained from the regions A to G.

Hereinafter, description will be made on the basis of simulation results of the patterns. Simulation conditions are as follows.

Tp=0.225 μm (both land and groove)
NA=0.85·PR (1233321)
Evaluation index: e-MLSE (described below)
Mark width=Tp×0.7
Disc Noise and Amp Noise are present.

The linear density is indicated with the use of a plane capacity obtained when a disc has a diameter of 120 mm and the track pitch of Tp=0.32 μm.

In particular, in the case of "low linear density",
LD 35.18 (GB) . . . . The plane capacity is 35.18 GB in the case of 0.053 μm/channel bit and Tp=0.32 μm.
In the case of Tp=0.225 μm (both land and groove), the plane capacity is 50.0 GB including LD 35.18 GB.
In the case of "high linear density",
LD 41 (GB) . . . . The plane capacity is 41 GB in the case of 0.04547 μm/channel bit and Tp=0.32 μm.
In the case of Tp=0.225 μm (both land and groove), the plane capacity is 58.3 GB including LD 41 GB.

"Adaptive Filter Characteristics in Pattern R2"

The adaptive filter characteristics of the pattern R2 with a low linear density will be described as a comparison example of the present disclosure. Herein, region division positions in the radial direction are positions of ±0.55 where a pupil radius is 1.0. As described above, reproduction information signals of a plurality of channels are processed in the multi-input adaptive equalizer unit 13. The multi-input adaptive equalizer unit 13 includes adaptive equalizer units, the number of which is equal to the number of channels. Each adaptive equalizer unit is formed as an FIR filter, and tap coefficients thereof are adaptively controlled.

Figure 8:
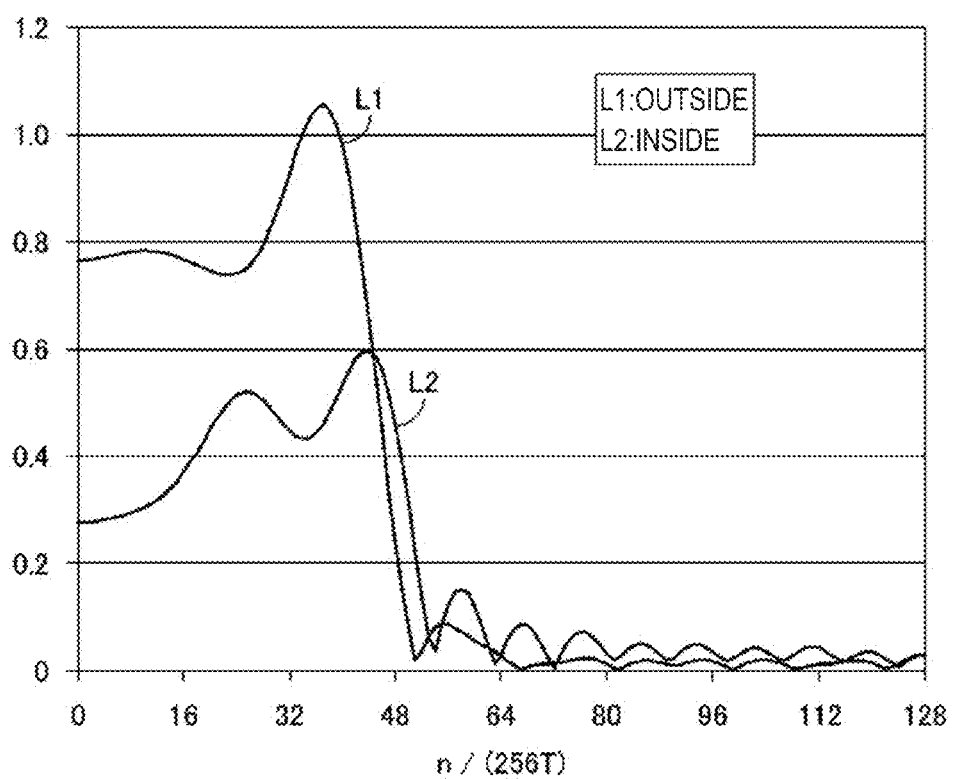
FIG. 8 is a graph showing frequency amplitude characteristics concerning a pattern R2.

FIG. 8 shows frequency amplitude characteristics obtained as a result of a simulation concerning the pattern R2. A characteristic L1 is a frequency amplitude characteristic of a channel corresponding to the outer region B, and a characteristic L2 is a frequency amplitude characteristic of a channel corresponding to the inner region A. The characteristics are exemplary characteristics at a perturbation origin. The perturbation origin herein means a state in which defocus, disc skew, and the like are all positioned at an origin and substantially the most favorable result can be basically obtained in the case where adaptive control is performed.

In the frequency amplitude characteristics, a horizontal axis is n/(256T) (n: value of horizontal axis). For example, in the case of (n=64), the horizontal axis is (64/256T)=(¼T). For example, in the case where the RLL (1, 7) PP modulation method is used, the mark length falls within a range of 2T to 8T, where the channel clock cycle is "T". (¼T) is a frequency obtained when a mark of 2T is repeated. In the characteristics of FIG. 8, the mark of 2T is in a frequency region where reproduction cannot be performed, and the mark of 3T can be reproduced.

FIG. 9A shows tap coefficients of channels of the pattern R2. For example, the number of taps in the FIR filter is set to 31. FIG. 9B shows a frequency phase characteristics of the channels. The frequency phase characteristics indicate a phase difference between two channels. As shown in FIG. 9B, the phase difference between the two channels is small.

"Reproduction Performance"

Figure 10:
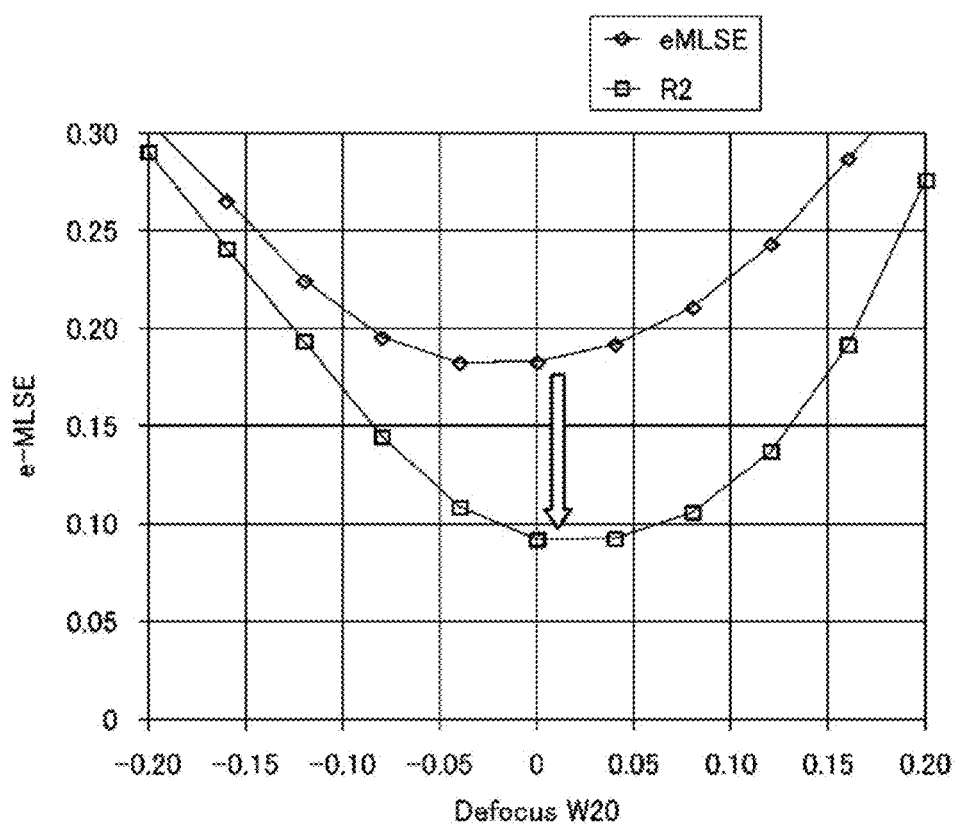
FIG. 10 is a graph for explaining a defocus margin concerning the pattern R2.
Figure 11:
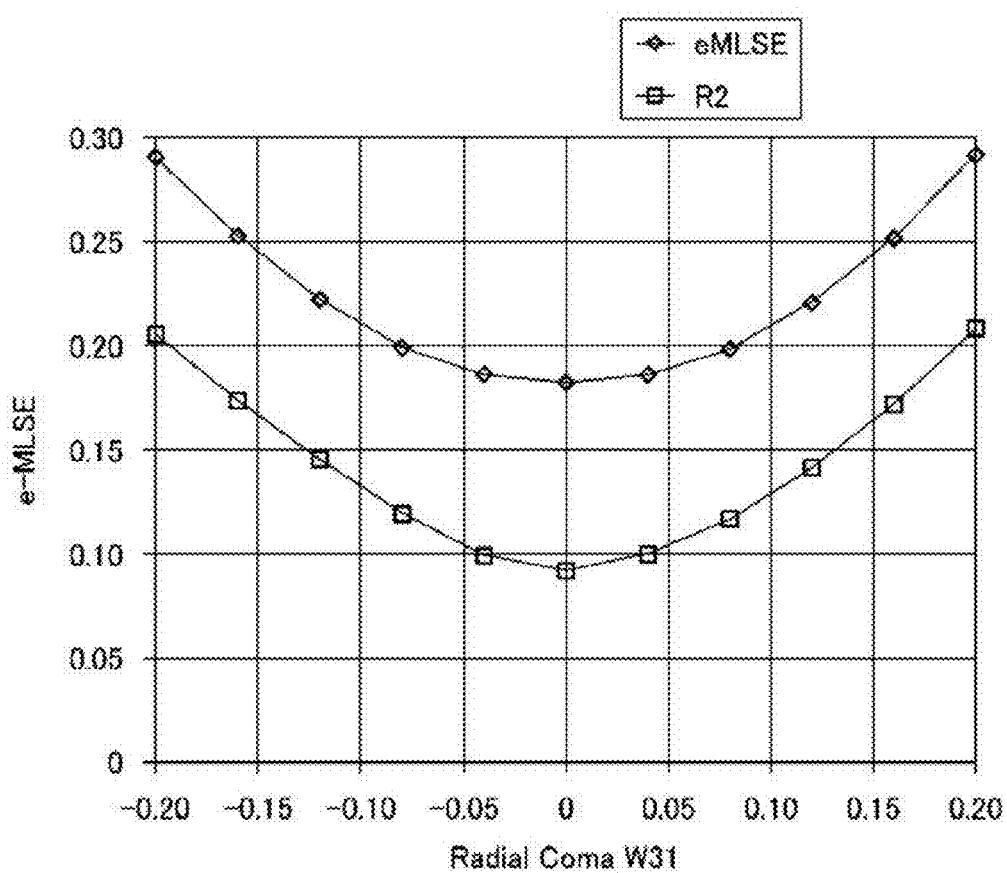
FIG. 11 is a graph for explaining a margin for comatic aberration in a radial direction concerning the pattern R2.

FIG. 10 and FIG. 11 show simulation results of reproduction performance concerning the pattern R2. FIG. 10 and FIG. 11 show effects of region division of the pattern R2 with a low linear density.

The linear density is indicated with the use of a plane capacity obtained when a disc has the diameter of 120 mm and the track pitch of Tp=0.32 μm.

In particular, in the case of "low linear density",
LD 35.18 (GB) . . . . The plane capacity is 35.18 GB in the case of 0.053 μm/channel bit and Tp=0.32 μm.
In the case of Tp=0.225 μm (both land and groove), the plane capacity is 50.0 GB including LD 35.18 GB.
NA=0.85
PR (1233321)
Evaluation index: e-MLSE
Mark width=Tp×0.7
Disc Noise and Amp Noise are present.

The region division positions in the radial direction are positions of ±0.55 where the pupil radius is 1.0.

In the above conditions, the e-MLSE is improved.

In the case where no division is performed (graph indicated by e-MLSE), there is no margin width satisfying the e-MLSE≤15%. On the contrary, as shown in FIG. 10, a defocus margin W20 has a total width of 0.21 (corresponding to ±0.18 μm). As shown in FIG. 11, a radial comatic aberration margin W31 has a total width of 0.25 (corresponding to ±0.44 deg.).

A horizontal axis in the graph of FIG. 10 indicates a defocus amount normalized by a wavelength. A value 0 means the defocus amount of 0. When reproduction is actually performed, de-focus is generated and therefore it is necessary to have a margin for the defocus.

In a graph of (normalized defocus amount vs. index), reproduction performance is higher as a value of the e-MLSE is smaller. As an example, it is preferable that the value of the e-MLSE be substantially 0.15 or less. Therefore, the defocus margin corresponds to a width of a range where the value of the e-MLSE is substantially 0.15 or less. The defocus margin is larger as the width is larger.

In addition to the defocus margin, a margin for skew of the disc is also important as a margin. FIG. 11 shows a margin for third-order comatic aberration W31 (aberration coefficient normalized by wavelength) corresponding to the skew in the radial direction of the disc. As an example, it is preferable that the value of the e-MLSE be substantially 0.15 or less. Therefore, the comatic aberration margin corresponds to the width of the range where the value of the e-MLSE is substantially 0.15 or less. The radial disc skew margin is larger as the width is larger.

A vertical axis of each of the graphs in FIG. 10 and FIG. 11 is an index for indicating reproduction performance. For example, a value of i-MLSE is known as the index. A maximum likelihood sequence error (MLSE) is an index corresponding to an error probability calculated by using a difference between a target level that is set with the use of Viterbi-detected data and a level of an actual signal. In the case of BDXL (registered trademark), calculation is performed by weighting a data pattern that easily causes some errors with the use of a method called i-MLSE.

In the case where the recording density is increased as compared with BDXL (registered trademark), a data pattern that easily causes an error is different. As a result, an error of the i-MLSE which is a conventional signal index value is problematic. In view of this, in the present disclosure, a signal evaluation value with new data patterns needed to improve accuracy of a signal index value with a higher linear density, which is different from the i-MLSE, is used to explain an effect. Hereinafter, such a new index value having improved accuracy is referred to as e-MLSE.

The following three data patterns are added in the e-MLSE.

A bit written as 1 in a pattern string indicates an error pattern, which is a part where bit inversion occurs, as contrasted with a detected pattern.
Additional pattern (1): 10111101
Additional pattern (2): 1011110111101
Additional pattern (3): 10111100111101

With a linear density equivalent to that of a conventional BDXL (registered trademark) for which accuracy of the i-MLSE is sufficient, the e-MLSE and the i-MLSE are substantially the same. With a higher linear density, a difference caused by improvement in accuracy appears. Both the e-MLSE and the i-MLSE have the same theoretical correlation between index value and error rate which is important in practical use. Therefore, although both the e-MLSE and the i-MLSE are different in calculation and a range of an applicable linear density, evaluation values of signal quality indicated by both the e-MLSE and the i-MLSE may be similarly comprehended. In the present disclosure, an index other than the e-MLSE may be used.

In the case of the pattern R2, amplitude phase characteristics that a crosstalk component originally has are used as they are, and signal characteristics are improved by using an inter-channel balance of amplitude characteristics and hardly changing an inter-channel phase difference. The pattern R2 is a pattern obtained by dividing a beam into inner and outer regions in the radial direction and can suppress crosstalk generated from an adjacent track when the track pitch is made narrower. Therefore, in an example where region division is performed only in the radial direction such as the pattern R2, deterioration of a signal caused by, for example, inter-symbol interference in the tangential direction cannot be sufficiently prevented. In the present disclosure described below, description will be made in consideration of this point.

"Region Division is Further Performed in Tangential Direction (Patterns H3A and H4C)"

Figure 12:
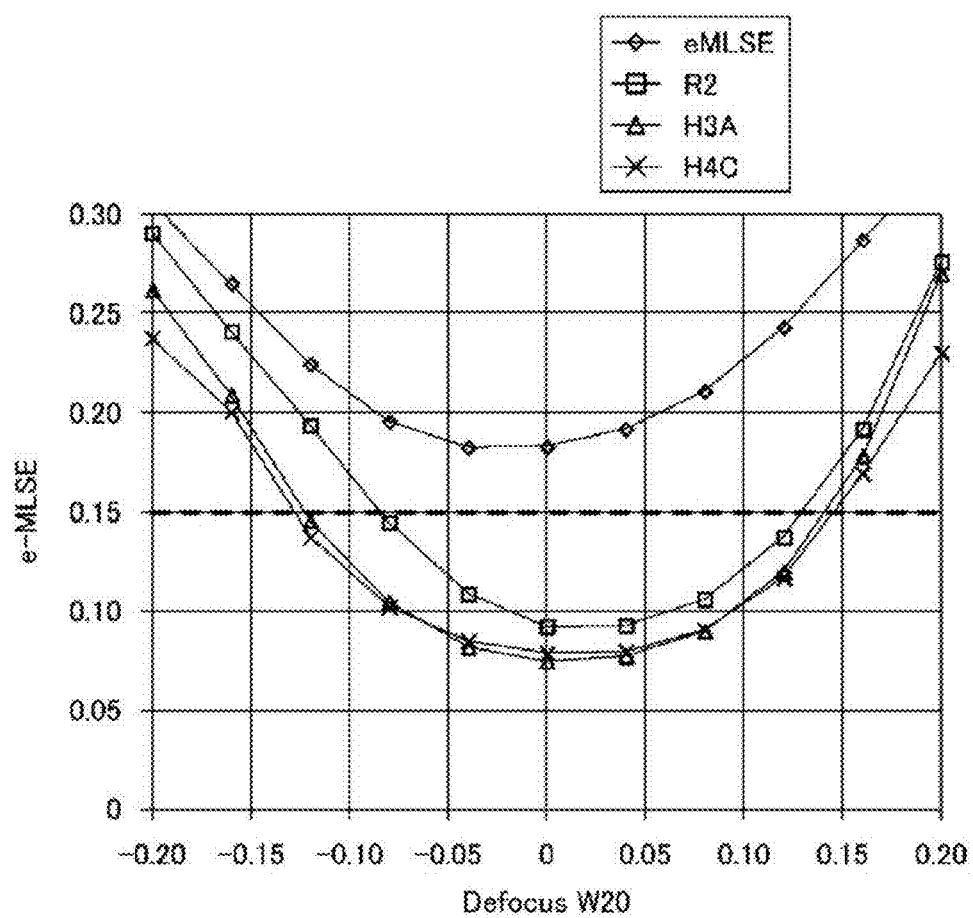
FIG. 12 is a graph for explaining defocus margins concerning patterns H3A and H4C.
Figure 13:
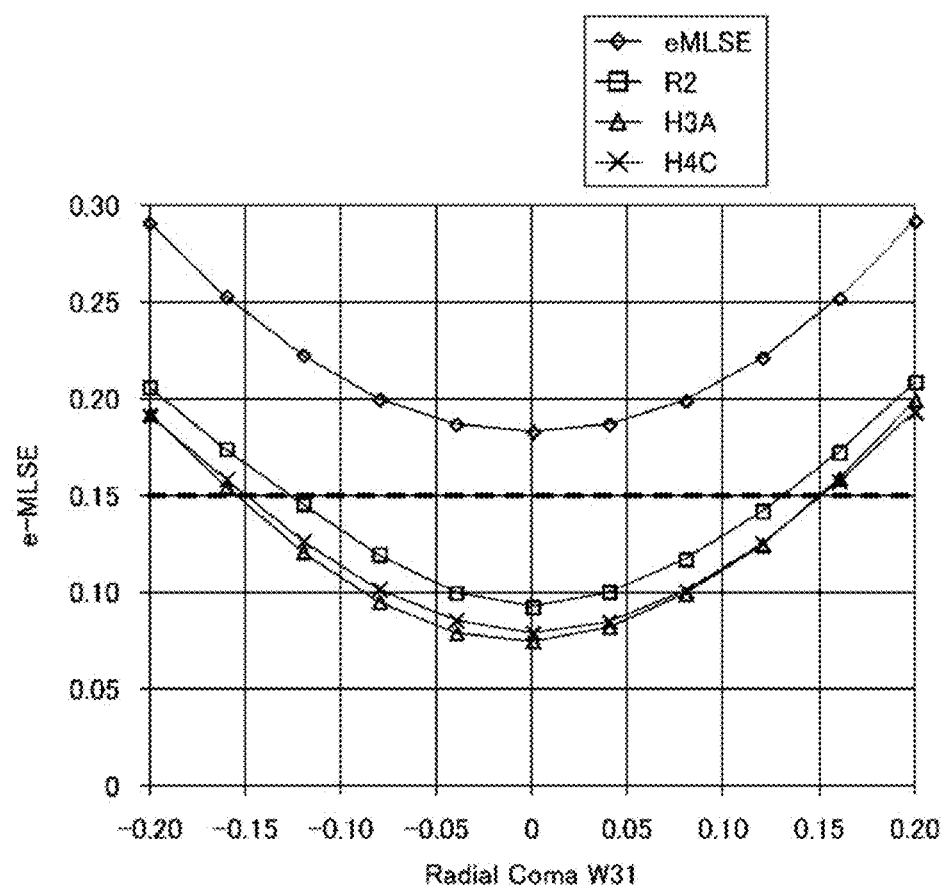
FIG. 13 is a graph for explaining margins for comatic aberration in a radial direction of a disc concerning the patterns H3A and H4C.
Figure 14:
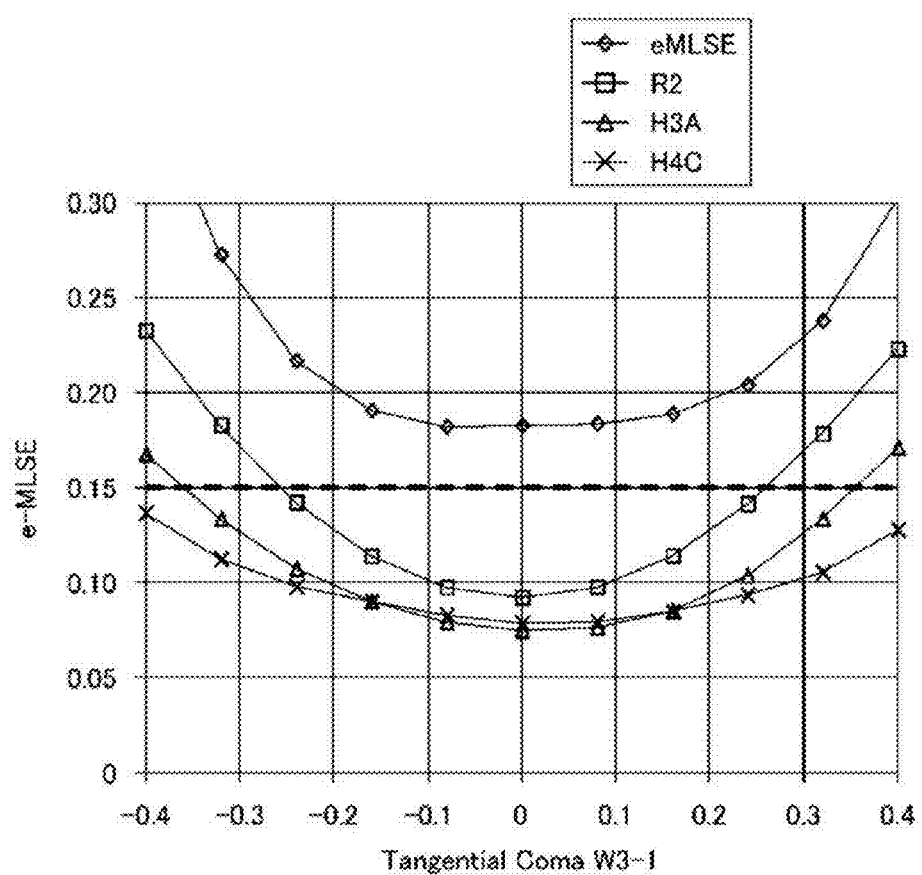
FIG. 14 is a graph for explaining margins for comatic aberration in a tangential direction of a disc concerning the patterns H3A and H4C.

As an example where region division is further performed in the tangential direction, reproduction performance of the patterns H3A and H4C (see FIG. 7) is shown in FIG. 12, FIG. 13, and FIG. 14. FIG. 12 is a graph of (normalized defocus amount vs. index). FIG. 13 is a graph of (normalized skew amount in radial direction vs. index). FIG. 14 is a graph of (normalized skew amount in tangential direction vs. index).

FIG. 12, FIG. 13, and FIG. 14 show effects of division in the tangential direction with a low linear density.

Simulation was performed in the following conditions.
LD 35.18 (GB) . . . 0.053 μm/channel bit
In the case of Tp=0.225 μm (both land and groove), the plane capacity is 50.0 GB.
NA=0.85
PR (1233321
Evaluation index: e-MLSE
Mark width=Tp×0.7
Disc Noise and Amp Noise are present.
The region division positions in the radial direction are positions of ±0.55 in common where the pupil radius is 1.0, and the region division positions in the tangential direction are positions of ±0.65 and ±0.30.

As is clear from FIG. 12 to FIG. 14, in the case where region division is further performed in the tangential direction, the bottom of the graph becomes lower and the margin is increased, as compared with the pattern R2 in which region division is performed only in the radial direction.

In the above conditions, the margins are improved in the pattern H3A as follows.

The defocus margin W20 has the total width of 0.27 (corresponding to ±0.23 μm). The radial comatic aberration margin W31 has the total width of 0.30 (corresponding to ±0.53 deg.).

In the above conditions, the margins are improved in the pattern H4C as follows.

The defocus margin W20 has the total width of 0.275 (corresponding to ±0.235 μm). The radial comatic aberration margin W31 has the total width of 0.30 (±0.53 deg.).

As described above, as compared with a case where division is performed only in the radial direction, it is possible to improve reproduction performance by performing region division not only in the radial direction but also in the tangential direction. In the description of this specification, it is assumed that the tap coefficients of the adaptive equalizer unit (FIR filter) are adaptively controlled. However, in the case where the best tap coefficients are obtained as a result of simulation, it is possible to use an equalizer unit in which the tap coefficients are fixed or use a filter having equivalent characteristics other than the FIR filter, such as an analog filter or a digital filter. Although the adaptive equalizer unit is superior in terms of performance, processing and hardware can be simplified because adaptive control of the tap coefficients is not needed. It is also possible to use fixed-type equalizer units for some of a plurality of channels and use adaptive equalizer units for the other channels.

"Adaptive Electro-Optical Filter Characteristics in Pattern H3A"

Figure 15:
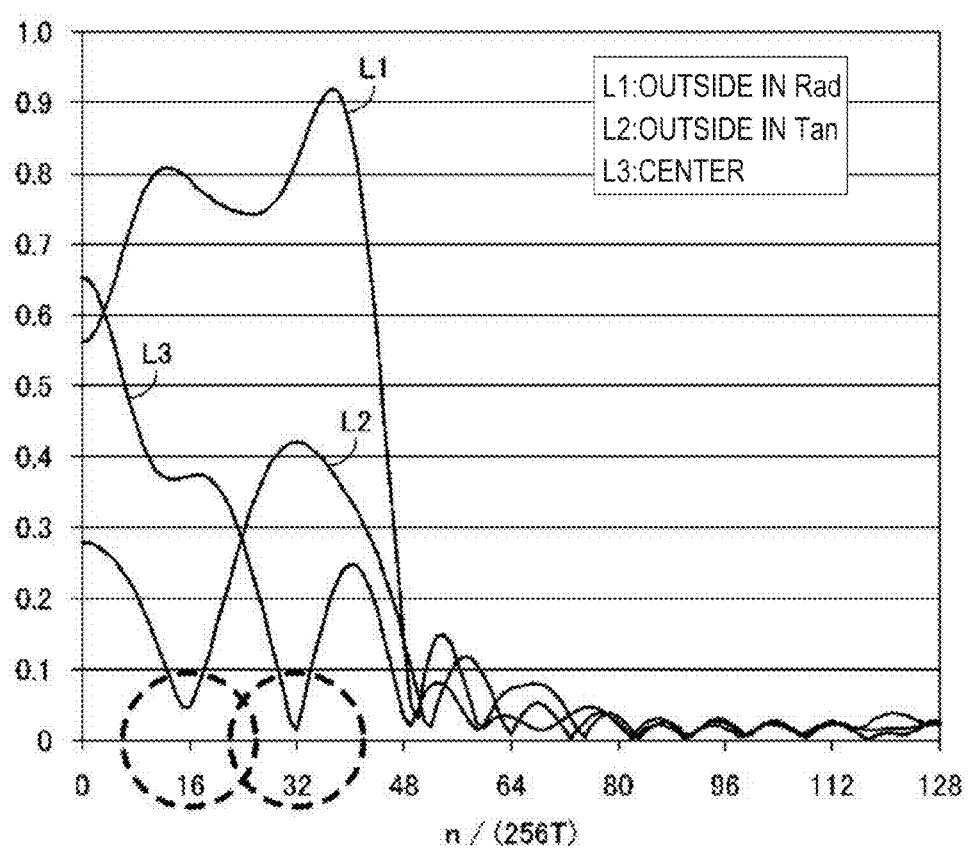
FIG. 15 is a graph showing frequency amplitude characteristics concerning the pattern H3A.

Adaptive electro-optical filter characteristics of the pattern H3A with a low linear density will be described. FIG. 15 shows frequency amplitude characteristics obtained as a result of simulation concerning the pattern H3A (see FIG. 7). The characteristic L1 is a frequency amplitude characteristic of a channel corresponding to the outer region B in the radial direction. A characteristic L2 is a frequency amplitude characteristic of a channel corresponding to the outer region C in the tangential direction. A characteristic L3 is a frequency amplitude characteristic of a channel corresponding to the central region A. The characteristics are exemplary characteristics at the perturbation origin.

FIG. 16A shows tap coefficients of the channels of the pattern H3A. For example, the number of taps in the FIR filter is set to 31. FIG. 16B shows frequency phase characteristics of the channels. The frequency phase characteristics indicate a phase difference between two channels of three channels. A characteristic L11 indicates a phase difference between reproduction information signals of channels corresponding to the outer region C in the tangential direction and the outer region B in the radial direction. A characteristic L12 indicates a phase difference between reproduction information signals of channels corresponding to the central region A and the outer region B in the radial direction. A characteristic L13 indicates a phase difference between reproduction information signals of channels corresponding to the outer region C in the tangential direction and the central region A.

As described above, the filter characteristics of H3A have the following features.

Filters having frequency characteristics that are largely different in amplitude and phase are formed in respective regions of the three channels, and favorable reproduction signals can be reproduced.

In a frequency band corresponding to a 3T signal (in the vicinity of a value 43 in the horizontal axis, which is surrounded by a broken line), a phase of the outer region C in the tangential direction and a phase of the outer region B in the radial direction are shifted by 180 deg. from the central region.

The central region has a characteristic that interrupts a frequency band corresponding to a 4T signal (in the vicinity of a value 32 in the horizontal axis, which is surrounded by a broken line), and a false signal caused by crosstalk is suppressed.

An outer side in the tangential direction should contribute to reproduction of a short mark and interrupts a frequency band corresponding to an 8T signal (in the vicinity of a value 16 in the horizontal axis, which is surrounded by a broken line).

As described above, a high-pass filter, a low-pass filter, a band-pass filter, a band-stop (or notch) filter, and the like are provided in each region. Therefore, the filter characteristics which cannot be achieved by applying only optics or only electricity are achieved.

Figure 17:
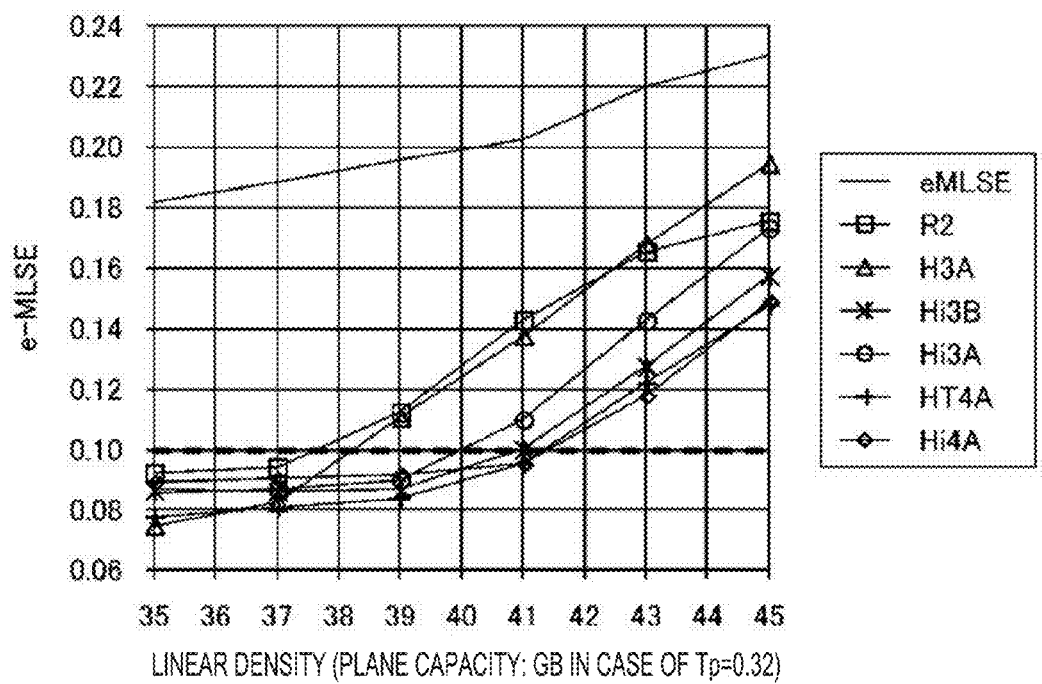
FIG. 17 is a graph showing a relationship between fixed linear density and index.

FIG. 17 shows a relationship between linear density and index in a fixed condition of (NA=0.85, Tp=0.225, PR (1233321)). In the case where channels that are different in central position in the tangential direction are provided, it is possible to favorably reproduce a signal with a higher linear density even in the same PR class. The characteristics can be improved by optimizing division positions in the tangential direction as in the pattern Hi3B. In the case of e-MLSE≤10% at the center of perturbation, the patterns R2 and H3A are up to LD 38 GB. Meanwhile, Hi3B, HT4A, and Hi4A can be up to LD 41 GB.

"High Linear Density Effect of Division in Tangential Direction"

Figure 18:
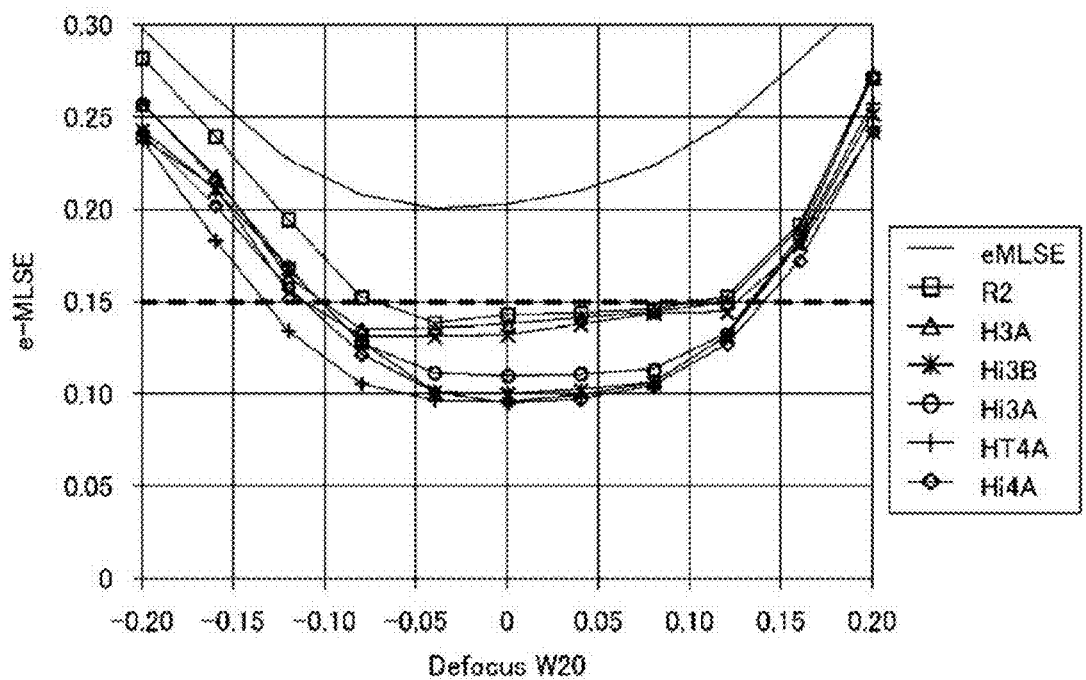
FIG. 18 is a graph used for explaining a defocus margin.
Figure 19:
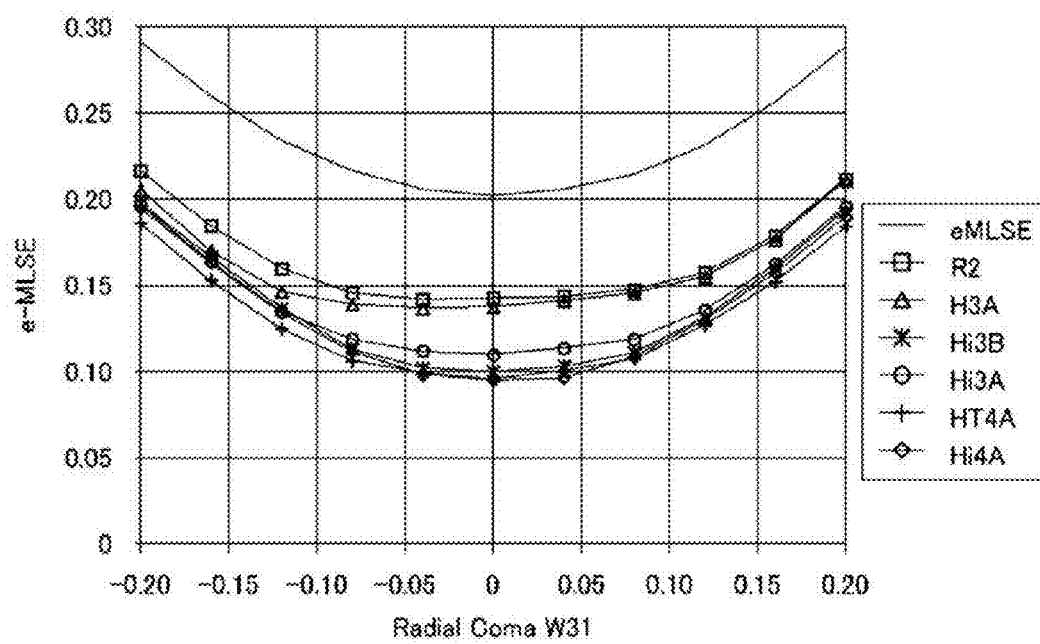
FIG. 19 is a graph used for explaining a comatic aberration margin in the radial direction.

Reproduction performance of the patterns H3A, Hi3A, Hi3B, HT4A, and Hi4A and reproduction performance of the patterns R2 and H3A for comparison (see FIG. 7) are shown in FIG. 18 and FIG. 19. FIG. 18 is a graph of (normalized defocus amount vs. index). FIG. 19 is a graph of (normalized skew amount in radial direction vs. index).

FIG. 18 and FIG. 19 show effects of division in the tangential direction with a high linear density.

Simulation was performed in the following conditions.
LD 41 (GB) . . . 0.04547 μm/channel bit
In the case of Tp=0.225 μm (both land and groove), the plane capacity is 58.3 GB including LD 41 (GB).
NA=0.85
PR (1233321)
Evaluation index: e-MLSE
Mark width=Tp×0.7
Disc Noise and Amp Noise are present.
The region division positions in the radial direction are positions of ±0.55 in common where the pupil radius is 1.0, and the region division positions in the tangential direction are positions of ±0.30 and ±0.65.

As is clear from FIG. 18 and FIG. 19, with a high density of LD 41 GB, the e-MLSE is changed in the vicinity of 15% in the patterns R2 and H3A having no channels that are different in central position in the tangential direction. Meanwhile, the patterns Hi3A, Hi3B, HT4A, and Hi4A having channels that are different in central position in the tangential direction sufficiently have a margin width satisfying e-MLSE≤15%. In particular, the pattern HT4A with LD 41 GB has a margin width equivalent to that in the pattern H3A with LD 35.18 GB.

"Adaptive Electro-Optical Filter Characteristics in Pattern HT4A"

Figure 20:
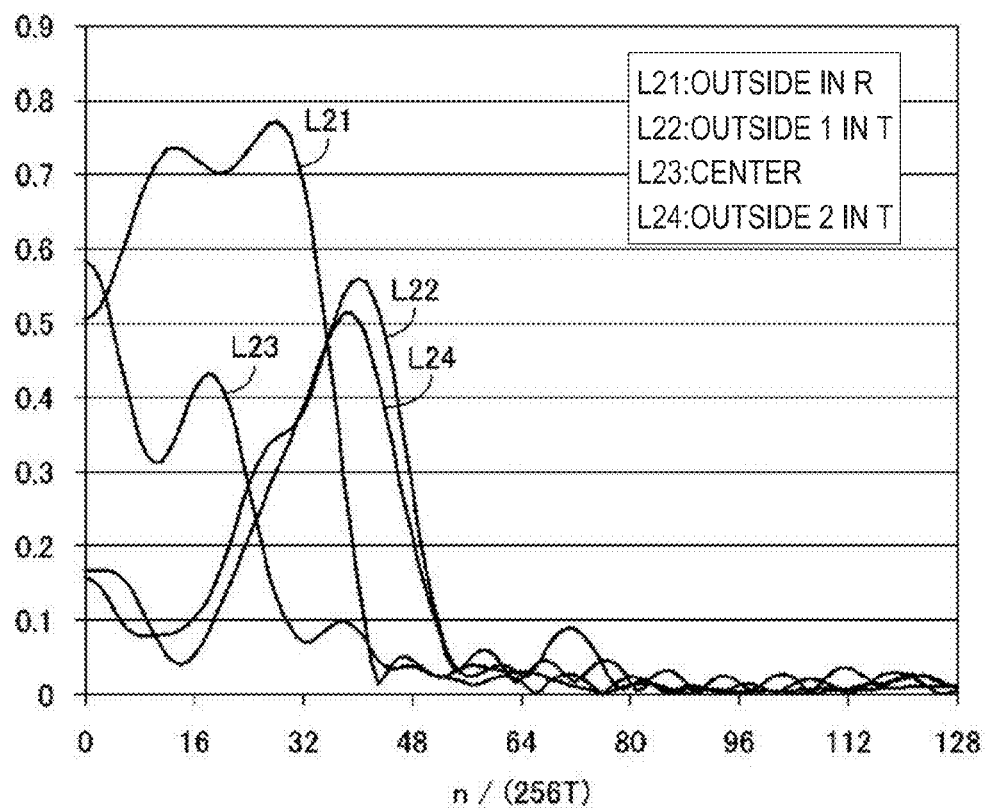
FIG. 20 is a graph showing frequency amplitude characteristics concerning a pattern HT4A.

Adaptive electro-optical filter characteristics in the pattern HT4A (see FIG. 7) with a high linear density will be described. FIG. 20 shows frequency amplitude characteristics obtained as a result of simulation concerning the pattern HT4A. A characteristic L21 indicates a frequency amplitude characteristic of a channel corresponding to the outer region B in the radial direction. A characteristics L22 indicates a frequency amplitude characteristic of a channel corresponding to the outer region C in the tangential direction. A characteristic L23 indicates a frequency amplitude characteristic of a channel corresponding to the central region A. A characteristic L24 indicates a frequency amplitude characteristic of a channel corresponding to the outer region D in the tangential direction. The characteristics are exemplary characteristics at the perturbation origin.

FIG. 21A shows tap coefficients of channels of the pattern HT4A. For example, the number of taps in the FIR filter is set to 31. FIG. 21B shows frequency phase characteristics of respective channels. The frequency phase characteristics indicate a phase difference between a channel corresponding to the outer region C in the tangential direction and a channel corresponding to the outer region D in the tangential direction.

The filter characteristics of HT4A have the following features.

As in the pattern H3A, the central region has a low-pass like characteristic and the outer region in the tangential direction has a high-pass like characteristic (Herein, a band-pass characteristic that allows passing of a band corresponding to shorter marks in a frequency band contributing to signal reproduction is referred to as a relatively high-pass like characteristic.).

In the pattern HT4A, the outer regions in the tangential direction are two independent channels. The two regions form a filter having a phase difference falling within the range of approximately 120 to 90 deg. in frequency bands corresponding to 3T and 4T (in the vicinity of values 43 and 32 in the horizontal axis) (corresponding to two clocks, as is clear from the tap coefficients). With this, it is possible to detect a short mark with a higher sensitivity, as compared with a reproduction amplitude of a simple total sum signal. In reproduction of a short mark, favorable reproduction signal characteristics in a high linear density region are achieved by also using the phase difference between the regions.

Figure 22:
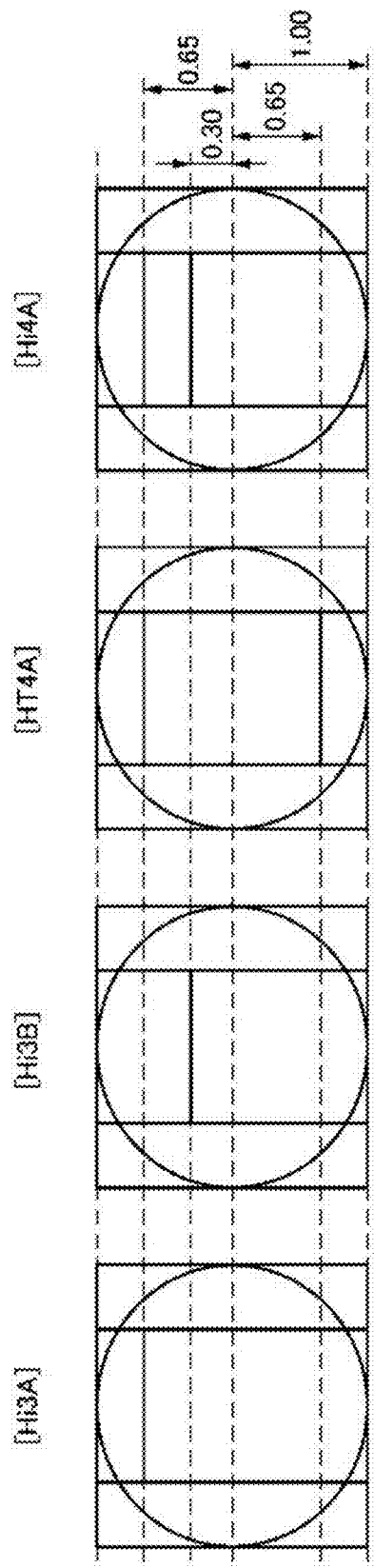
FIG. 22 is a schematic diagram showing a specific example of region division.

As is clear from the above graphs of linear density dependence, the characteristics can be improved without depending on the linear density by changing the division position in some cases as in the case of the pattern Hi3B from the pattern Hi3A, and the characteristics are inverted depending on the linear density in some case as in the case of HT4A and Hi4A. FIG. 22 shows several specific examples of region division. In the case where a linear density (plane capacity) which is more important for the system is determined, it is possible to optimize a division pattern therefor.

"Characteristic Optimization by Region Division"

Optimization of a division pattern will be described by taking the case of a low linear density with which various kinds of division patterns exhibit favorable characteristics.

LD 35.18 (GB) . . . 0.053 µm/channel bit

In the case of Tp=0.225 µm (both land and groove), the plane capacity is 50 GB.

NA=0.85

PR (1233321)

Evaluation index: e-MLSE

Mark width=Tp×0.7

Disc Noise and Amp Noise are present.

Figure 23:
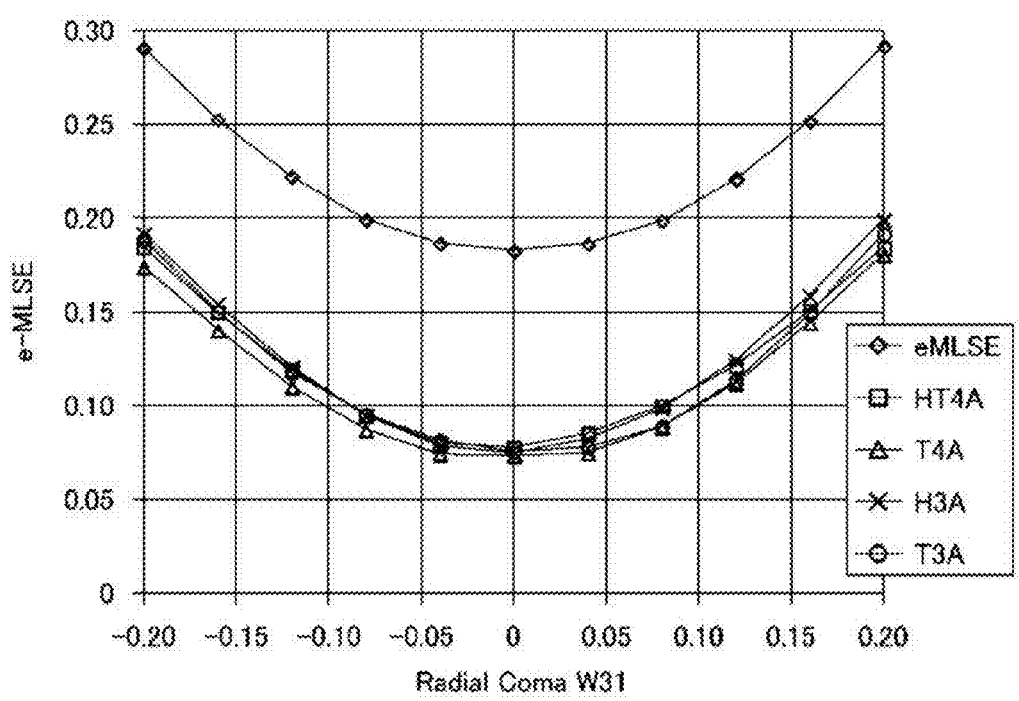
FIG. 23 is a graph showing increase in margin of radial comatic aberration caused by a change of division position.

FIG. 23 shows increase in margin of radial comatic aberration caused by changing the division positions. In the patterns HT4A and H3A, the division positions are ±0.55 in the radial direction and are ±0.65 in the tangential direction. In the patterns T4A and T3A, the division positions are ±0.7 in the radial direction and are ±0.6 in the tangential direction, and a division shape at four corners is also changed.

As is clear from FIG. 23, in the pattern HT4A, the radial comatic margin W31 has the total width of 0.32 (corresponding to ±0.56 deg.). In the pattern T4A, the radial comatic margin W31 has the total width of 0.34 (corresponding to ±0.60 deg.). In the pattern H3A, the radial comatic margin W31 has the total width of 0.30 corresponding to ±0.53 deg.). In the pattern T3A, the radial comatic margin W31 has the total width of 0.32 (corresponding to ±0.56 deg.).

"Effect Obtained by Independently Providing Outer Regions Divided in Radial Direction"

FIG. 24 shows patterns obtained by dividing a beam into three regions only in the radial direction. FIG. 24 shows cases where a visual field is moved in a pseudo way in accordance with a lens shift (denoted by LS in FIG. 24) of the objective lens. R2 (regions A, B1 and B2) and R3 (regions A, B, and C) are assumed as patterns. It is assumed that a lens shift of 0.2 occurs in the radial direction (0.2 corresponds to 10% because a cross-section of a luminous flux of a beam has a diameter of 2.0.).

"Effect 1 Obtained by Independently Providing Outer Regions Divided in Radial Direction"

Figure 25:
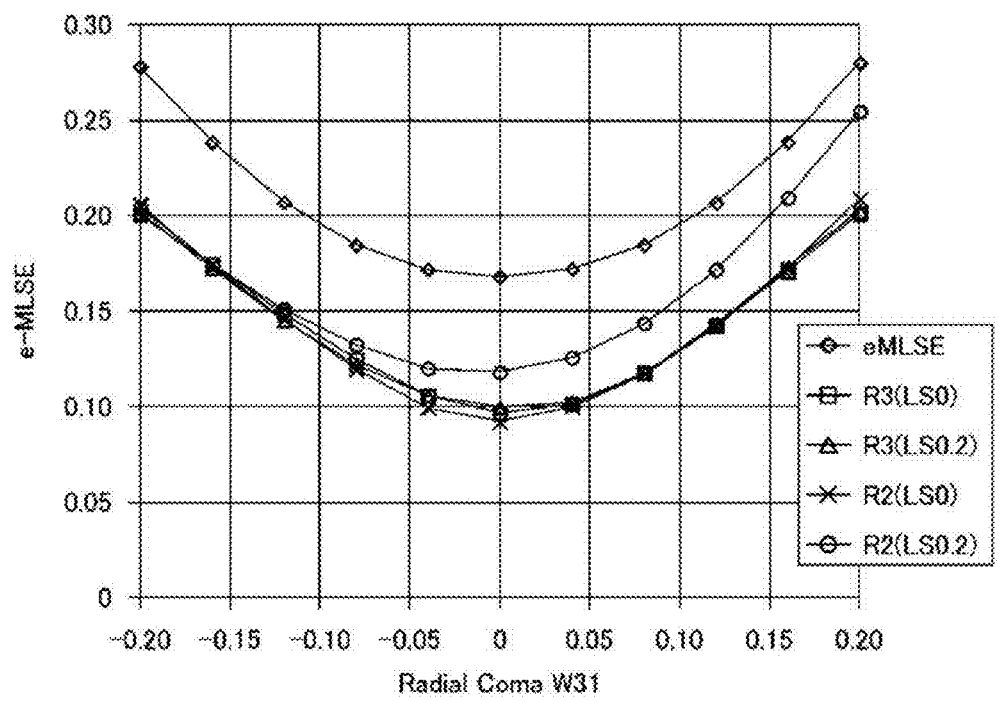
FIG. 25 is a graph showing an influence of a lens shift upon radial comatic aberration.

FIG. 25 is a graph showing a simulation result of the margins of the radial comatic aberration concerning those patterns. As shown in FIG. 25, the margin of the comatic aberration in the pattern of R2 (LS 0.2) is decreased. That is, in the case where a beam is divided in the radial direction, an influence of visual field movement can be reduced by independently providing two outer regions. There is another method for reducing an influence of the visual field movement as described below.

"Change of Margin of Radial Comatic Aberration at the Time of Lens Shift"

FIG. 26A shows a change of radial comatic aberration characteristics caused by pseudo visual field movement (0.1 shift and 0.2 shift) concerning the pattern R3. FIG. 26B shows a 0.2 shift, and FIG. 26C shows no shift. As is clear from FIG. 26A, a change of a margin width of radial comatic aberration caused by visual field movement can be suppressed by optimizing a division width.

FIG. 27A shows a change of radial comatic aberration characteristics caused by pseudo visual field movement (0.1 shift and 0.2 shift) concerning the pattern T4A. FIG. 27B shows a 0.2 shift, and FIG. 27C shows no shift. As is clear from FIG. 27A, the margin width caused by visual field movement can be ensured. However, the center slightly shifts.

FIG. 28A shows a change of radial comatic aberration characteristics caused by pseudo visual field movement (0.1 shift and 0.2 shift) concerning the pattern T3A. FIG. 28B shows a 0.2 shift, and FIG. 28C shows no shift. As is clear from FIG. 28A, the margin width caused by visual field movement is abruptly reduced. Therefore, in the case of the pattern T3A, it is necessary to suppress a visual field movement amount.

"Change of Defocus Margin at the Time of Lens Shift"

FIG. 29A shows a change of defocus characteristics caused by pseudo visual field movement (0.1 shift and 0.2 shift) concerning the pattern R3. FIG. 29B shows a 0.2 shift, and FIG. 29C shows no shift. As is clear from FIG. 29A, a change of a defocus margin width caused by visual field movement can be suppressed by optimizing a division width.

Figure 30:
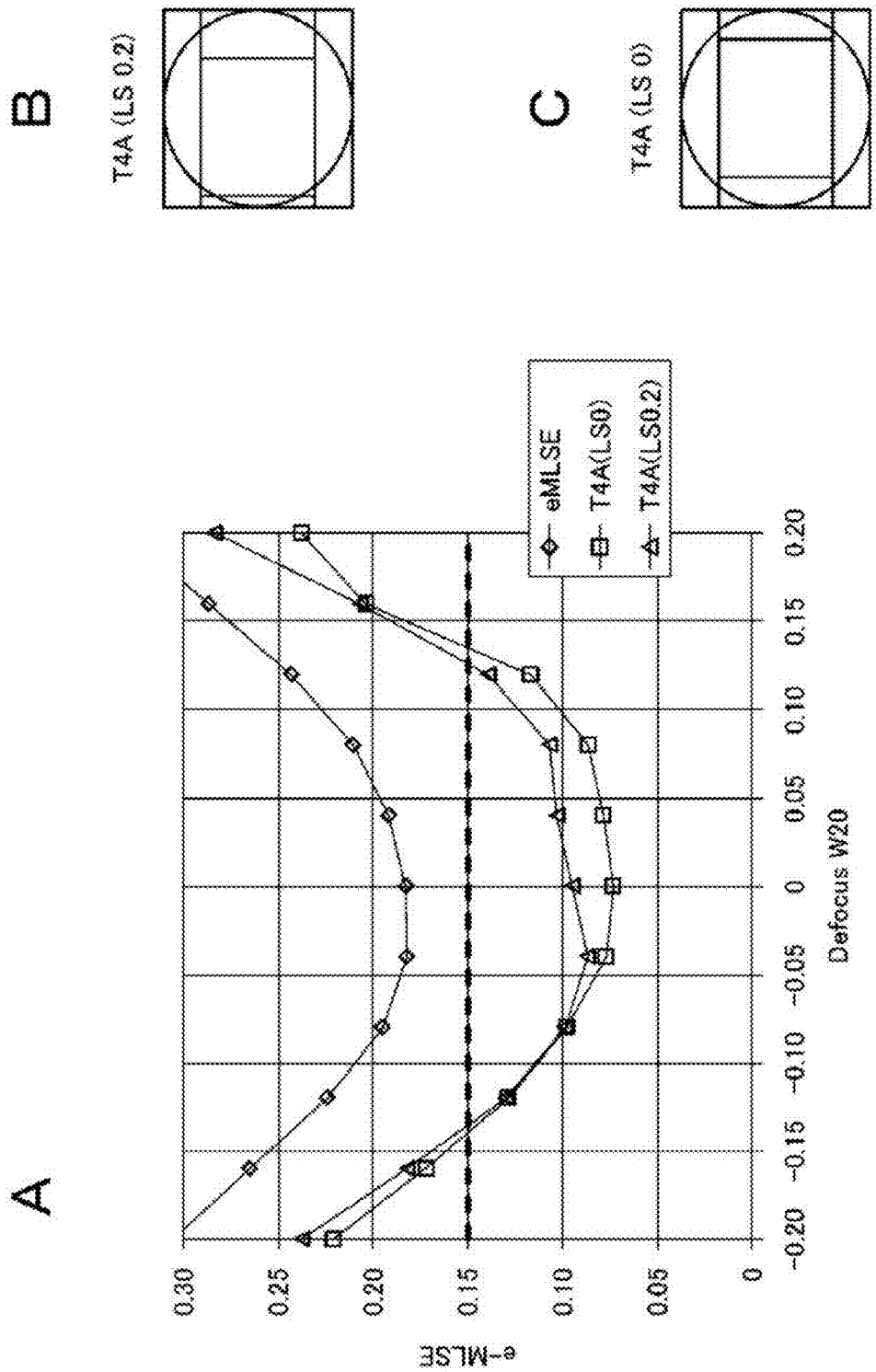
FIG. 30 is a graph showing an influence of a lens shift upon defocus characteristics.

FIG. 30A shows a change of defocus characteristics caused by pseudo visual field movement (0.1 shift and 0.2 shift) concerning the pattern T4A. FIG. 30B shows a 0.2 shift, and FIG. 30C shows no shift. As is clear from FIG. 30A, the defocus margin width caused by visual field movement can be ensured.

FIG. 31A shows a change of defocus characteristics caused by pseudo visual field movement (0.1 shift and 0.2 shift) concerning the pattern T3A. FIG. 31B shows a 0.2 shift, and FIG. 31C shows no shift. As is clear from FIG. 31A, the defocus margin width caused by visual field movement is abruptly reduced. Therefore, in the case of the pattern T3A, it is necessary to suppress the visual field movement amount.

"Pattern that has Three Channels and is Strong Against Lens Shift"

As is clear from the above characteristics shown in FIG. 26A, the pattern R3 has three channels and is strong against the lens shift, as compared with the pattern T3A. That is, the radial comatic aberration margin is ±0.125 (corresponding to ±0.44 deg.) with no lens shift and is ±0.125 (corresponding to ±0.44 deg.) with a lens shift of 0.2.

A pattern that has three channels and is strong against a lens shift is Hi3A. FIG. 32A shows a change of radial comatic aberration characteristics caused by pseudo visual field movement (0.1 shift and 0.2 shift) concerning the pattern Hi3A. FIG. 32B shows a 0.2 shift, and FIG. 32C shows no shift. As is clear from FIG. 32A, the margin width caused by visual field movement can be ensured to the same degree as the pattern T4A (see FIG. 27) having four channels. That is, the radial comatic aberration margin is ±0.16 (corresponding to ±0.56 deg.) with no lens shift and is −0.155 to +0.12 (corresponding to −0.54 deg. to +0.42 deg.) with a lens shift of 0.2.

Figure 33:
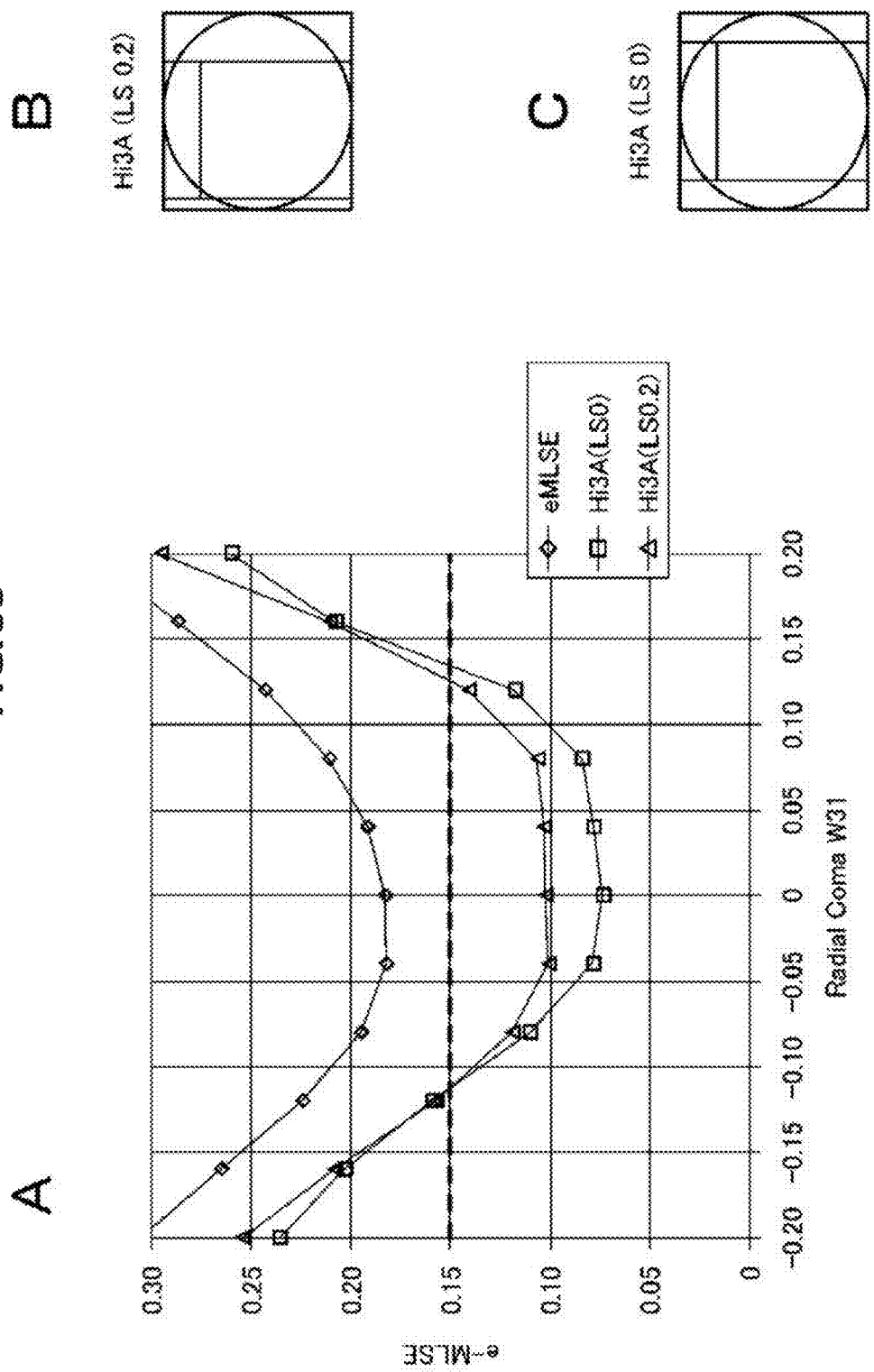
FIG. 33 is a graph showing an influence of a lens shift upon defocus characteristics.

FIG. 33A shows a change of defocus characteristics caused by pseudo visual field movement (0.1 shift and 0.2 shift) concerning the pattern Hi3A. FIG. 33B shows a 0.2 shift, and FIG. 33C shows no shift. As is clear from FIG. 33A, the margin width caused by visual field movement can be ensured to the same degree as the pattern T4A (see FIG. 29) having four channels. That is, the defocus margin is 0.25 (corresponding to ±0.21 µm) with no lens shift and is 0.24 (corresponding to ±0.20 µm) with a lens shift of 0.2.

"Pattern that has Four Channels and is Strong Against Lens Shift"

As is clear from the characteristics illustrated in FIG. 27A, the pattern T4A has four channels and is strong against the lens shift, as compared with the pattern T3A. That is, the radial comatic aberration margin is ±0.17 (corresponding to ±0.60 deg.) with no lens shift and is −0.17 to +0.135 (corresponding to −0.60 deg. to +0.47 deg.) with a lens shift of 0.2.

A pattern that has four channels and is strong against a lens shift is X4A. FIG. 34A shows a change of radial comatic aberration characteristics caused by pseudo visual field movement (0.1 shift and 0.2 shift) concerning the pattern X4A. FIG. 34B shows a 0.2 shift, and FIG. 34C shows no shift. As is clear from FIG. 34A, there is substantially no change of a margin of radial comatic aberration caused by visual field movement. That is, the radial comatic aberration margin is ±0.17 (corresponding to ±0.60 deg.) with no lens shift and is ±0.16 (corresponding to ±0.56 deg.) with a lens shift of 0.2.

FIG. 35A shows a change of defocus characteristics caused by pseudo visual field movement (0.1 shift and 0.2 shift) concerning the pattern X4A. FIG. 35B shows a 0.2 shift, and FIG. 35C shows no shift. As is clear from FIG. 35A, a change of the defocus margin caused by visual field movement is small. That is, the defocus margin is 0.265 (corresponding to ±0.225 µm) with no lens shift and is 0.25 (corresponding to ±0.21 µm) with a lens shift of 0.2.

"Effect 2 Obtained by Independently Providing Outer Regions Divided in Radial Direction"

Figure 36:
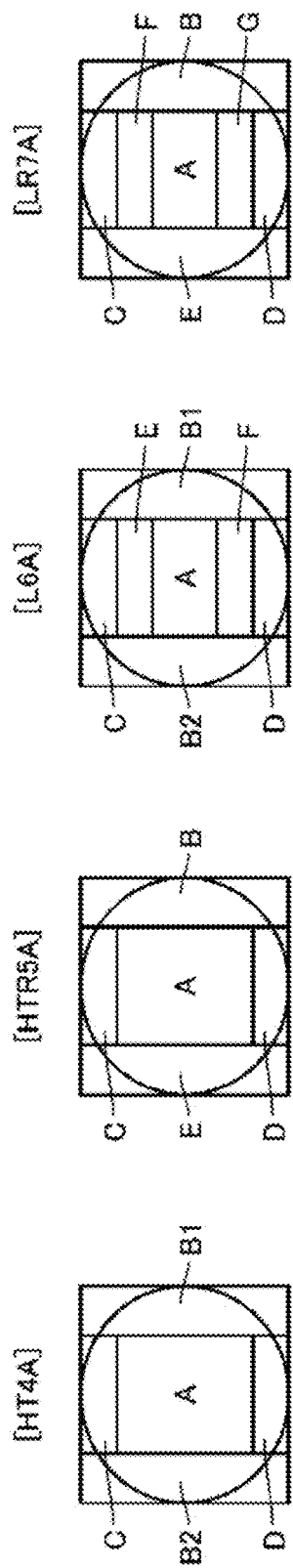
FIG. 36 is a schematic diagram showing a specific example of a pattern of region division.
Figure 37:
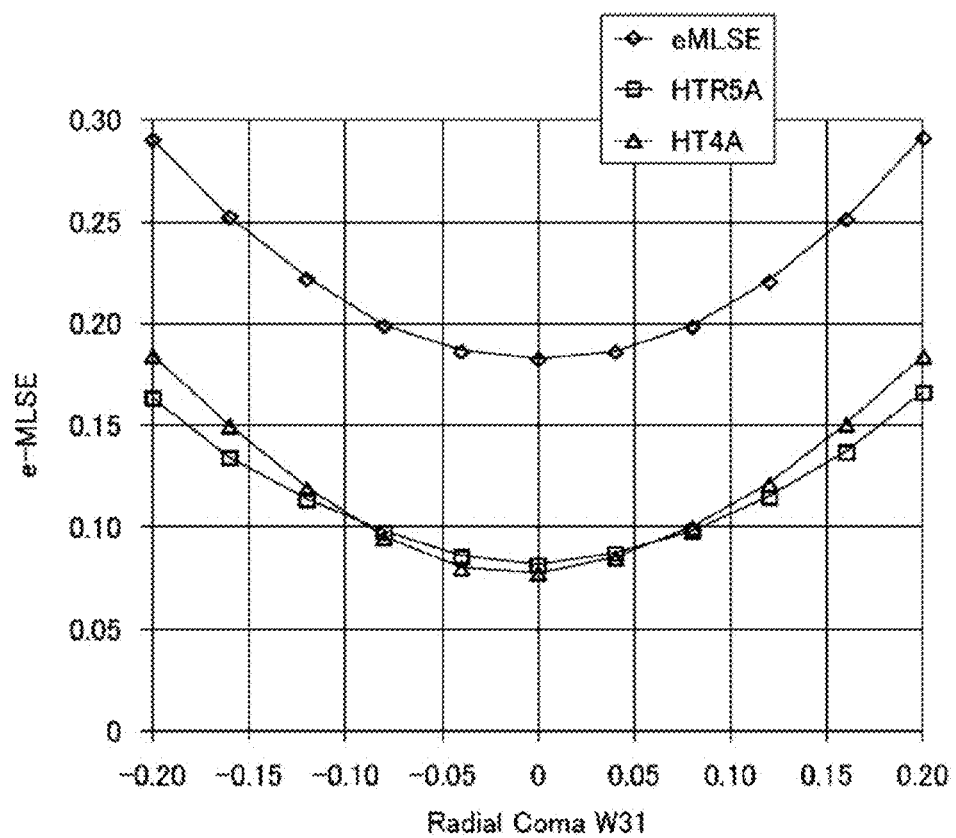
FIG. 37 is a graph used for explaining a comatic aberration margin in the radial direction.
Figure 38:
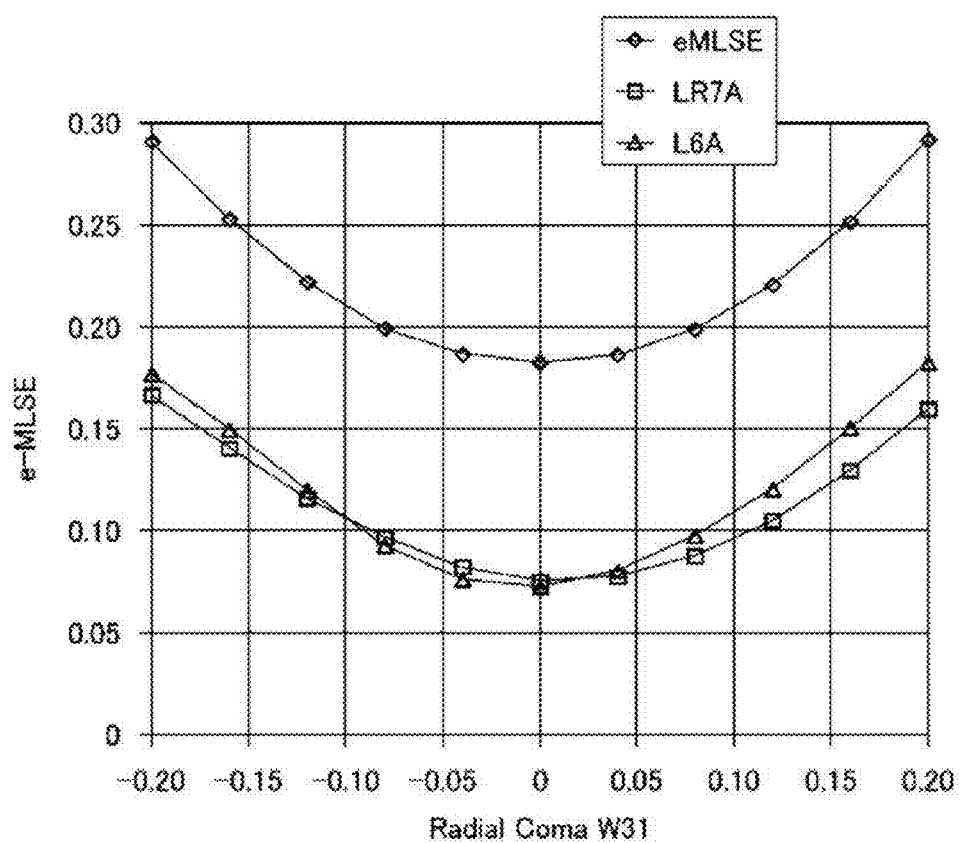
FIG. 38 is a graph used for explaining a comatic aberration margin in the radial direction.

FIG. 36 shows the patterns HT4A, HTR5A, L6A, and LR7A. FIG. 37 and FIG. 38 show radial comatic aberration characteristics of those patterns. FIG. 37 shows radial comatic aberration characteristics of the patterns HT4A and HTR5A obtained when region division is not performed. FIG. 38 shows radial comatic aberration characteristics of the patterns LR7A and L6A obtained when region division is not performed. As is clear from FIG. 37 and FIG. 38, the radial comatic aberration margin can be increased by combining division in the radial direction with division in the tangential direction.

Additionally, the present technology may also be configured as below.

(1)
An optical medium reproduction device that optically reproduces an optical medium in which a plurality of tracks are provided, the optical medium reproduction device including:
a detection unit configured to divide a cross-section of a beam returning from the optical medium into at least one channel corresponding to an outer region in a radial direction, at least one channel corresponding to a region that is different in position in a tangential direction, and a channel corresponding to the other region, and form detection signals of the channels;
a multi-input equalizer unit including a plurality of equalizer units to which the detection signals of the plurality of channels are supplied, respectively, the multi-input equalizer unit being configured to calculate outputs of the plurality of equalizer units and output the outputs as an equalized signal in a manner that a phase difference between two of the regions is set to be a predetermined phase difference; and
a binarization unit configured to perform a binarization process on the equalized signal to obtain binary data.

(2)
The optical medium reproduction device,
wherein the multi-input equalizer unit is configured as a multi-input adaptive equalizer unit, and
wherein the optical medium reproduction device includes an equalization error calculation unit configured to calculate an equalization error by using an equalization target signal obtained on the basis of a binarization detection result of the binarization unit and the equalized signal output from the multi-input adaptive equalizer unit and supply the equalization error to the adaptive equalizer unit as a control signal for adaptive equalization.

(3)
The optical medium reproduction device according to (2),
wherein the multi-input adaptive equalizer unit performs a partial response equalization process on the detection signals of the plurality of regions,
wherein the binarization unit performs a maximum likelihood decoding process as the binarization process performed on the equalized signal of the multi-input adaptive equalizer unit, and
wherein the equalization error calculation unit calculates an equalization error by performing calculation with the use of the equalization target signal obtained by performing a convolution process of the binarization detection result obtained by the maximum likelihood decoding and the equalized signal output from the multi-input adaptive equalizer unit.

(4)
The optical medium reproduction device according to (1),
wherein the detection unit includes divided detectors corresponding to the plurality of regions, and
wherein the detection signals of the plurality of regions are extracted from the photodetector.

(5)
The optical medium reproduction device according to (1),
wherein an optical path conversion element that separates the plurality of regions is provided in an optical path leading to the detectors through an objective lens, and
wherein a plurality of beams separated by the optical path conversion element are input to the different detectors.

(6)
The optical medium reproduction device according to (1),
wherein lands and grooves are alternately provided in the optical medium, and
wherein information is recorded on both the lands and the grooves.

(7)

An optical medium reproduction method for optically reproducing an optical medium in which a plurality of tracks are provided, the optical medium reproduction method including:

dividing a cross-section of a beam returning from the optical medium into at least one channel corresponding to an outer region in a radial direction, at least one channel corresponding to a region that is different in position in a tangential direction, and a channel corresponding to the other region, and forming detection signals of the channels, by using a detection unit;

calculating outputs of a plurality of equalizer units to which the detection signals of the plurality of channels are supplied, respectively, and outputting the outputs as an equalized signal, by using a multi-input equalizer unit, in a manner that a phase difference between two of the regions is set to be a predetermined phase difference; and performing a binarization process on the equalized signal by using a binarization unit to obtain binary data.

2. Modification Example

Embodiments of the present disclosure have been specifically described in the above description. However, the present disclosure is not limited to the above embodiments, and various modifications based on the technical thoughts of the present disclosure can be implemented. For example, the above numerical values of the wavelength of the laser light source, the track pitch, and the recording linear density are merely examples, and other numerical values may be used. Further, as the index for evaluating the reproduction performance, an index other than the above index may be used. Furthermore, the present disclosure is applicable to an optical disc device that performs only one of recording and reproduction on an optical disc.

Also, the configurations, methods, processes, shapes, materials and numerical values described in the above embodiments can be combined with each other as long as the gist of the present disclosure is not departed.

REFERENCE SIGNS LIST

13 . . . multi-input adaptive equalizer
14 . . . binarization detector
15 . . . PR convolution unit
21 to 23 . . . adaptive equalizer unit
100 . . . optical disc
101 . . . optical pickup
105 . . . data detection processing unit

The invention claimed is:

1. An optical medium reproduction device that optically reproduces an optical medium in which a plurality of tracks are provided, the optical medium reproduction device comprising:

a detection unit configured to:
divide a cross-section of a beam returning from the optical medium into a plurality of channels, the plurality of channels comprising a channel corresponding to a central region, at least one channel corresponding to an outer region in a radial direction, and at least one channel corresponding to a region that is different in position from the central region in a tangential direction, and
form a plurality of detection signals, wherein each detection signal of the plurality of detection signals is formed from one or more of the plurality of channels;

a multi-input equalizer unit including a plurality of equalizer units, wherein each equalizer unit of the plurality of equalizer units is configured to:
receive one of the plurality of detection signals; and
calculate an output of the equalizer unit by applying an equalizer filter to the received detection signal,
wherein the multi-input equalizer unit is configured to sum the outputs of the plurality of equalizer units to generate an equalized signal, and
wherein one or more of the equalizer filters is configured to generate a target phase difference between the outputs of two of the equalizer units corresponding to two respective regions; and a binarization unit configured to receive the equalized signal from the multi-input equalizer unit and perform a binarization process on the equalized signal to obtain binary data.

2. The optical medium reproduction device according to claim 1,
wherein the multi-input equalizer unit is configured as a multi-input adaptive equalizer unit, and
wherein the optical medium reproduction device includes an equalization error calculation unit configured to calculate an equalization error by using an equalization target signal obtained on the basis of a binarization detection result of the binarization unit and the equalized signal output from the multi-input adaptive equalizer unit and supply the equalization error to the multi-input adaptive equalizer unit as a control signal for adaptive equalization.

3. The optical medium reproduction device according to claim 2,
wherein the multi-input adaptive equalizer unit performs a partial response equalization process on the plurality of detection signals,
wherein the binarization unit performs a maximum likelihood decoding process as the binarization process performed on the equalized signal of the multi-input adaptive equalizer unit, and
wherein the equalization error calculation unit is configured to calculate an equalization error using 1) the equalization target signal obtained by performing a convolution process with the binarization detection result obtained by the maximum likelihood decoding process and 2) the equalized signal output from the multi-input adaptive equalizer unit.

4. The optical medium reproduction device according to claim 1,
wherein the detection unit includes divided detectors corresponding to the plurality of regions, and
wherein the plurality of detection signals are extracted from the detection unit.

5. The optical medium reproduction device according to claim 1,
wherein an optical path conversion element that separates the plurality of regions is provided in an optical path leading to the detectors through an objective lens, and
wherein a plurality of beams separated by the optical path conversion element are input to the different detectors.

6. The optical medium reproduction device according to claim 1,
wherein lands and grooves are alternately provided in the optical medium, and wherein information is recorded on both the lands and the grooves.

7. The optical medium reproduction device according to claim 1, wherein each equalizer filter is a finite impulse response filter.

8. The optical medium reproduction device according to claim 1, wherein the region that is different in position from the central region in the tangential direction is a first tangential region, and further wherein the detection unit is further configured to divide the cross-section of the beam returning from the optical medium into at least one channel corresponding to a second tangential region that is different in position from the central region in the tangential direction.

9. The optical medium reproduction device according to claim 1, wherein the equalizer unit corresponding to the outer region in the radial direction is configured to output a signal with a phase shifted by 180 degrees from the output of the equalizer unit corresponding to the central region.

10. The optical medium reproduction device according to claim 1, wherein the equalizer unit corresponding to the region that is different in position from the central region in the tangential direction is configured to output a signal with a phase shifted by 180 degrees from the output of the equalizer unit corresponding to the central region.

11. The optical medium reproduction device according to claim 1, wherein the target phase difference between the outputs of two of the equalizer units corresponding to two respective regions is determined based on frequency components of the respective outputs.

12. An optical medium reproduction method for optically reproducing an optical medium in which a plurality of tracks are provided, the optical medium reproduction method comprising:
dividing a cross-section of a beam returning from the optical medium into a plurality of channels, the plurality of channels comprising a channel corresponding to a central region, at least one channel corresponding to an outer region in a radial direction, and at least one channel corresponding to a region that is different in position from the central region in a tangential direction;
forming a plurality of detection signals, wherein each detection signal of the plurality of detection signals is formed from one or more of the plurality of channels;
receiving, by each equalizer unit of a plurality of equalizer units included in a multi-input equalizer input, one of the plurality of detection signals;
calculating, by each equalizer unit, an output of the equalizer unit by applying an equalizer filter to the received detection signal; and
outputting, by the multi-input equalizer unit, the sum of the outputs of each of the plurality of equalizer units as an equalized signal,
wherein one or more of the equalizer filters are configured to generate a target phase difference between the outputs of two of the equalizer units corresponding to two respective regions; and
performing, using a binarization unit, a binarization process on the equalized signal output by the multi-input equalizer unit to obtain binary data.

13. An optical medium reproduction device that optically reproduces an optical medium in which a plurality of tracks are provided, the tracks encoding data using a plurality of marks on the optical medium, the optical medium reproduction device comprising:
a detection unit configured to:
divide a cross-section of a beam returning from the optical medium into a plurality of channels, the plurality of channels comprising a channel corresponding to a central region, at least one channel corresponding to an outer region in a radial direction, and at least one channel corresponding to a region that is different in position from the central region in a tangential direction;
form a plurality of detection signals, wherein each detection signal is formed from one or more of the plurality of channels;
a multi-input equalizer unit including a plurality of equalizer units, wherein each of the equalizer units of the plurality of equalizer units is configured to:
receive one of the plurality of detection signals; and
calculate an output of the equalizer unit by applying an equalizer filter to the received detection signal,
wherein the multi-input equalizer unit is configured to sum the outputs of the plurality of equalizer units to generate an equalized signal, and
wherein the frequency and phase characteristics of one or more of the equalizer filters are set such that the optical medium reproduction device is configured to reproduce a shortest mark on the optical medium smaller than 0.149 micrometers in length; and
a binarization unit configured to obtain binary data by performing a binarization process on the equalized signal received from the multi-input equalizer unit.

14. The optical medium reproduction device according to claim 13,
wherein
the equalizer filter in at least one equalizer unit to which a detection signal of the channel corresponding to the outer region in the radial direction is supplied,
the equalizer filter in at least one equalizer unit to which a detection signal of the channel corresponding to the region that is different in position in the tangential direction is supplied, and
the equalizer filter in an equalizer unit to which a detection signal of the channel corresponding to the central region is supplied
have filter characteristics that are different in frequency characteristics of an amplitude and/or a phase.

15. The optical medium reproduction device according to claim 13,
wherein the plurality of channels includes a channel in which a positive maximum value and a negative maximum value of tap coefficients are substantially the same.

16. The optical medium reproduction device according to claim 13, wherein the plurality of equalizer units includes first and second equalizer units to which detection signals of first and second channels corresponding to regions that are different in position from the central region in the tangential direction are supplied,
wherein a tap position is a position where a positive maximum value of tap coefficients of the first equalizer unit and a positive maximum value of tap coefficients of the second equalizer unit are different.

17. The optical medium reproduction device according to claim 13, wherein the frequency and phase characteristics of the one or more equalizer filters are configured such that the optical medium reproduction device is configured to reproduce a shortest mark on the optical medium smaller than 0.112 micrometers in length.

18. The optical medium reproduction device according to claim 17, wherein the frequency and phase characteristics of the one or more equalizer filters are configured such that the optical medium reproduction device is configured to reproduce a shortest mark on the optical medium 0.09094 micrometers in length.

19. The optical medium reproduction device according to claim 13, wherein the frequency and phase characteristics of the one or more equalizer filters are configured based on a comparison of a binarization error probability to a threshold.

* * * * *